United States Patent
Sugahara et al.

(10) Patent No.: US 10,755,437 B2
(45) Date of Patent: Aug. 25, 2020

(54) INFORMATION PROCESSING DEVICE, IMAGE RECOGNITION METHOD AND NON-TRANSITORY COMPUTER READABLE MEDIUM

(71) Applicant: KABUSHIKI KAISHA TOSHIBA, Minato-ku (JP)

(72) Inventors: Atsushi Sugahara, Kawasaki (JP); Kazuma Komoda, Fuchu (JP); Haruna Eto, Arakawa (JP); Akihito Ogawa, Fujisawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 283 days.

(21) Appl. No.: 15/902,048

(22) Filed: Feb. 22, 2018

(65) Prior Publication Data

US 2019/0087976 A1    Mar. 21, 2019

(30) Foreign Application Priority Data

Sep. 19, 2017    (JP) .................................. 2017-179454

(51) Int. Cl.
*G06K 9/00* (2006.01)
*G06T 7/73* (2017.01)
(Continued)

(52) U.S. Cl.
CPC ............ *G06T 7/75* (2017.01); *G06K 9/00201* (2013.01); *G06K 9/6262* (2013.01);
(Continued)

(58) Field of Classification Search
CPC ....... G06K 9/00201; G06T 19/20; G06T 7/74; G06T 7/75; G06T 17/00; G06T 2219/004; G06T 2219/2016; G06T 7/593; H04N 2013/0092; H04N 13/0275; H04N 13/0282; H04N 13/221; H04N 13/243; H04N 13/275; H04N 13/282; H04N 2013/0081; C23C 14/042; C23C 14/50; C23C 16/042; C23C 16/4587; H01L 21/6715; H01L 21/67709; H01L 21/67712; H01L 21/682; H01L 21/6831; H01L 51/0011

See application file for complete search history.

(56) References Cited

U.S. PATENT DOCUMENTS 8,306,314 B2   11/2012  Tuzel et al.
9,757,858 B2    9/2017  Eto et al.
(Continued)

FOREIGN PATENT DOCUMENTS

JP    2010-183384    8/2010
JP    2011-138490    7/2011
(Continued)

*Primary Examiner* — Tom Y Lu
(74) *Attorney, Agent, or Firm* — Oblon, McClelland, Maier & Neustadt, L.L.P.

(57) ABSTRACT

According to one embodiment, an information processing device includes a camera and a processing circuit. The camera takes first distance images of an object for a plurality of angles. The processing circuit generates a three-dimensional model of the object based on the first distance image, and generates an extracted image indicating a specific region of the object corresponding to the plurality of angles based on the three-dimensional model.

13 Claims, 19 Drawing Sheets

(51) Int. Cl.
*G06T 19/20* (2011.01)
*H04N 13/275* (2018.01)
*H04N 13/282* (2018.01)
*G06K 9/62* (2006.01)
*H04N 13/243* (2018.01)
*G06T 17/00* (2006.01)
*H04N 13/221* (2018.01)
*H04N 13/00* (2018.01)
*G06T 7/593* (2017.01)

(52) U.S. Cl.
CPC .............. *G06K 9/6274* (2013.01); *G06T 7/73* (2017.01); *G06T 7/74* (2017.01); *G06T 17/00* (2013.01); *G06T 19/20* (2013.01); *H04N 13/221* (2018.05); *H04N 13/243* (2018.05); *H04N 13/275* (2018.05); *H04N 13/282* (2018.05); *G06K 2209/19* (2013.01); *G06K 2209/40* (2013.01); *G06T 7/593* (2017.01); *G06T 2207/10028* (2013.01); *G06T 2207/20081* (2013.01); *G06T 2207/20084* (2013.01); *G06T 2219/004* (2013.01); *G06T 2219/2016* (2013.01); *H04N 2013/0081* (2013.01); *H04N 2013/0092* (2013.01)

(56) References Cited

U.S. PATENT DOCUMENTS

| | | | |
|---|---|---|---|
| 9,758,300 | B2 | 9/2017 | Nakamura et al. |
| 9,811,745 | B2 | 11/2017 | Nakamura et al. |
| 2002/0050988 | A1* | 5/2002 | Petrov ............... G06K 9/20 345/418 |
| 2010/0111364 | A1* | 5/2010 | Iida ............... G06K 9/00214 382/103 |
| 2011/0043613 | A1* | 2/2011 | Rohaly ............. G06K 9/00214 348/50 |
| 2017/0061664 | A1 | 3/2017 | Ishii et al. |
| 2017/0281110 | A1* | 10/2017 | Mandelkern ........... A61B 6/025 |

FOREIGN PATENT DOCUMENTS

| | | |
|---|---|---|
| JP | 2012-146108 | 8/2012 |
| JP | 2015-014819 | 1/2015 |
| JP | 2015-224125 | 12/2015 |
| JP | 2016-118971 | 6/2016 |
| JP | 2016-119499 | 6/2016 |
| JP | 2016-132521 | 7/2016 |
| JP | 2017-045441 | 3/2017 |

* cited by examiner

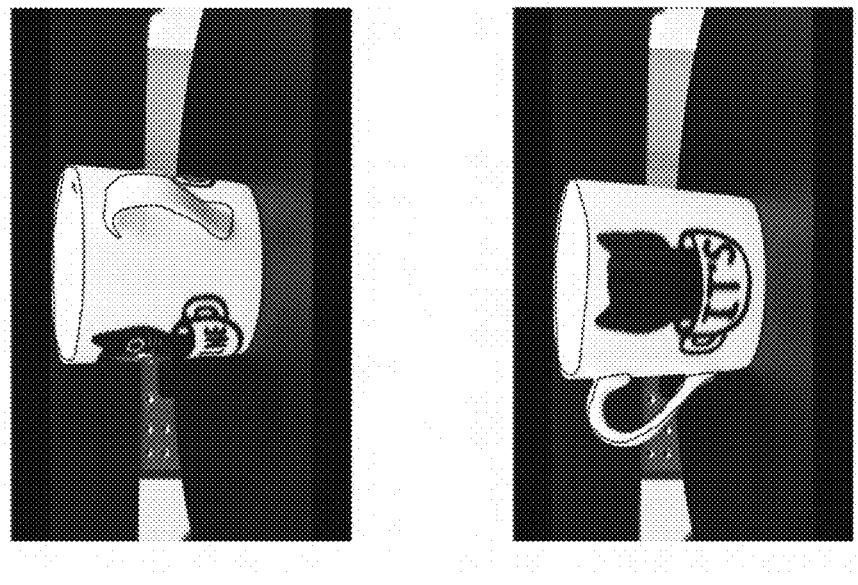
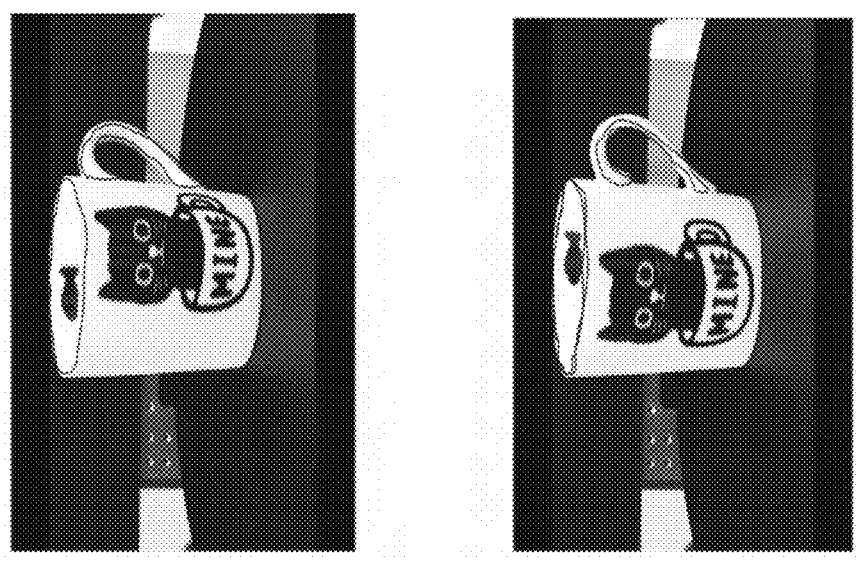
FIG. 7

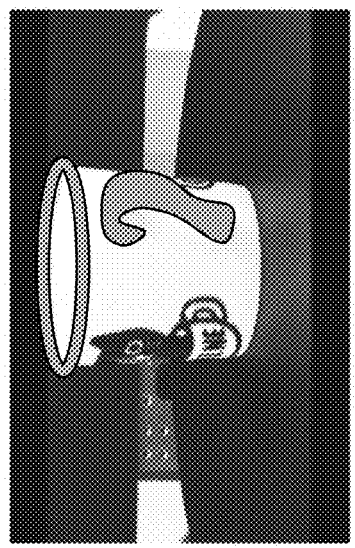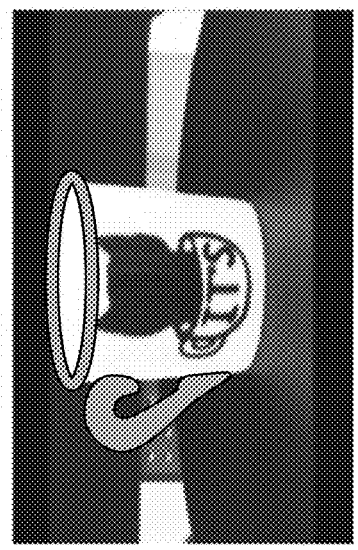
FIG. 8

INFORMATION PROCESSING DEVICE, IMAGE RECOGNITION METHOD AND NON-TRANSITORY COMPUTER READABLE MEDIUM

CROSS-REFERENCE TO RELATED APPLICATIONS

This application is based upon and claims the benefit of priority from Japanese Patent Application No. 2017-179454, filed on Sep. 19, 2017; the entire contents of which are hereby incorporated by reference.

FIELD

Embodiments described herein relate generally to an information processing device, an image recognition method and a non-transitory computer readable medium.

BACKGROUND

In the field of logistics, technology which enables the automation of cargo handling and assortment of packages is being developed. When the objects are lifted for transportation, the gripping locations need to be determined using images taken by cameras. Since the objects are not always aligned, the correct gripping locations have to be detectable, regardless of the alignments and the directions. Also, the gripping locations have to be detectable for different shapes of objects.

One way of detecting the gripping location is the use of models learned by methods such as deep learning or the like, for estimating the corresponding region within the image. Training data with few hundred to millions of annotated images need to be prepared, to generate a model which can recognize images by learning. The annotated images are prepared by labeling the areas that need to be detected, for each image. Since the segmentation of images into regions has been done manually, a long period of time was needed to prepare the training data. Also, the quality of data varied depending on the images. Therefore, it was not easy to add an object with a different shape into the scope of image recognition.

BRIEF DESCRIPTION OF THE DRAWINGS

FIG. 7 shows examples of objects that are annotated manually;

FIG. 8 shows examples of objects that are annotated with three-dimensional CAD software;

DETAILED DESCRIPTION

According to one embodiment, an information processing device includes a camera and a processing circuit. The camera takes first distance images of an object for a plurality of angles. The processing circuit generates a three-dimensional model of the object based on the first distance image, and generates an extracted image indicating a specific region of the object corresponding to the plurality of angles based on the three-dimensional model.

Hereinafter, embodiments of the present invention will be described with reference to the drawings.

First Embodiment

Figure 1:
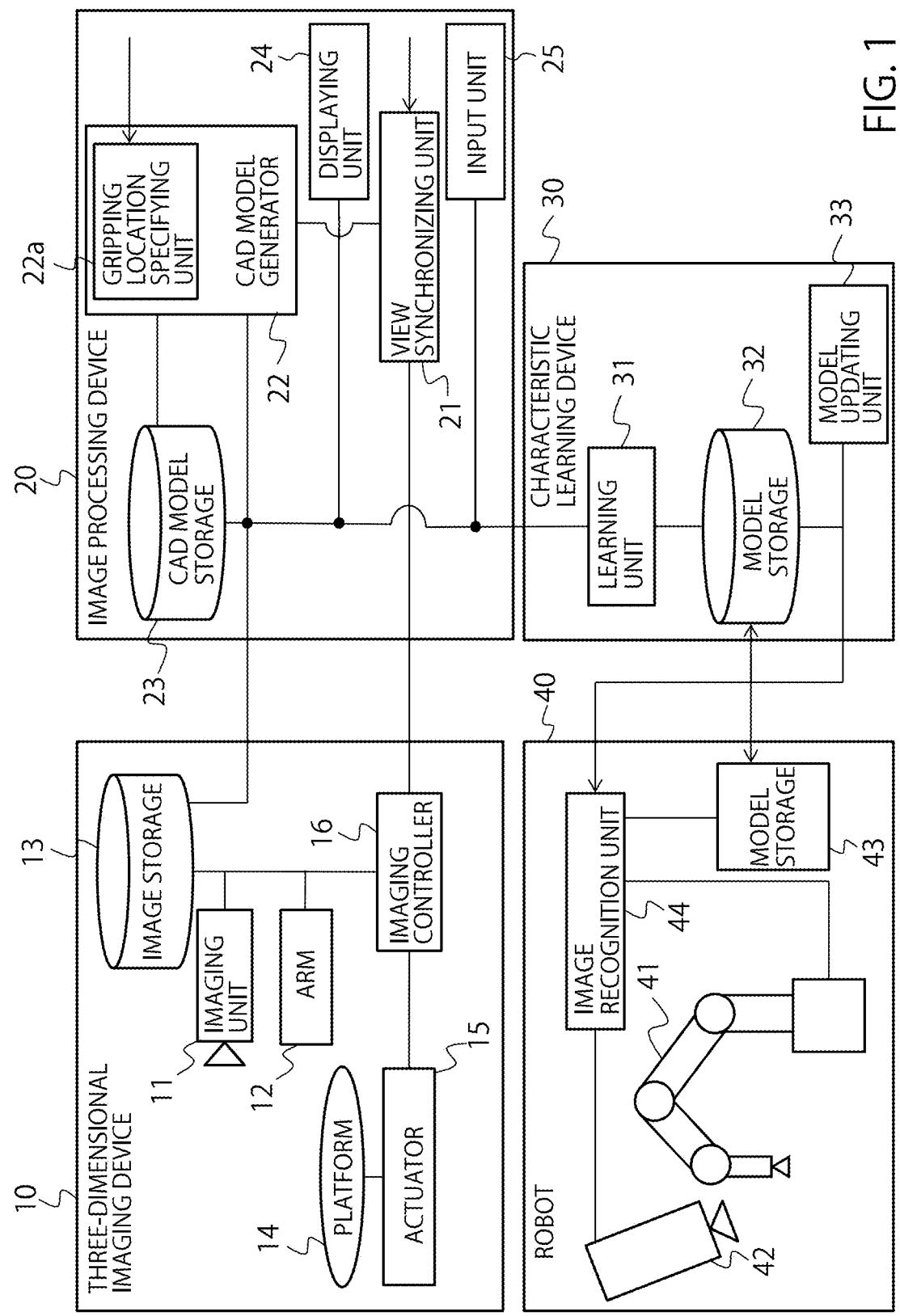
FIG. 1 is a diagram showing components of the system according to the first embodiment.

FIG. 1 is a block diagram showing configuration of a system according to a first embodiment. A system according to a first embodiment will be described with reference to FIG. 1.

The system according to FIG. 1 includes a three-dimensional imaging device 10, an image processing device 20, a characteristic learning device 30, and a robot 40. In FIG. 1 only one robot 40 is illustrated. However, the system may include multiple robots. The number of the three-dimensional imaging device 10 is not limited to one. There could be a plurality of three-dimensional imaging devices. Below, the overview of the system according to the first embodiment is explained.

Figure 2:
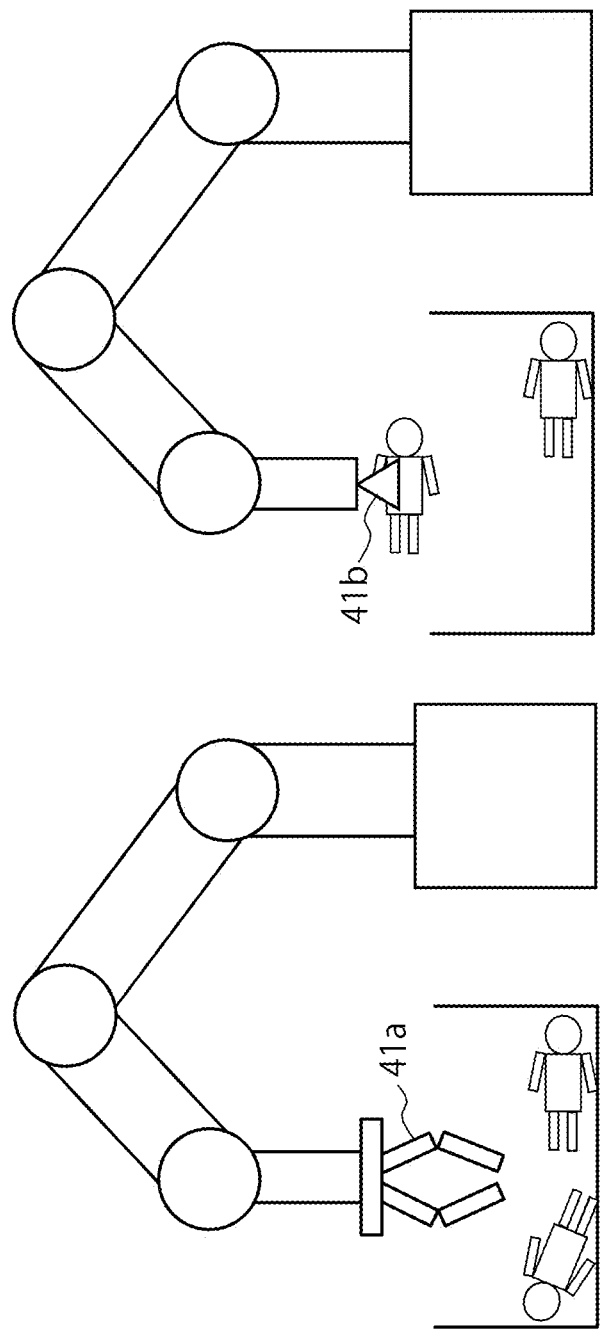
FIG. 2 is a diagram showing an example of a robotic hand according to the first embodiment.

The robot 40 is a robot used for cargo handling tasks. The robot 40 has a robotic hand that can grip objects. FIG. 2 shows an example of a robotic hand. The left side of FIG. 2 shows a robotic hand with a 2-finger gripper 41a. Such robotic hands can grip objects by pinching the objects between the fingers, during transportation of objects.

The right side of FIG. 2 shows a robotic hand with a suction cup 41b. Such robotic hands can grip objects by sticking the objects to the suction cup, during the transportation of objects. The aforementioned robotic hands are only examples. Robots with robotic hands of different shapes or different types can be used in the embodiment according to the invention.

Figure 3:
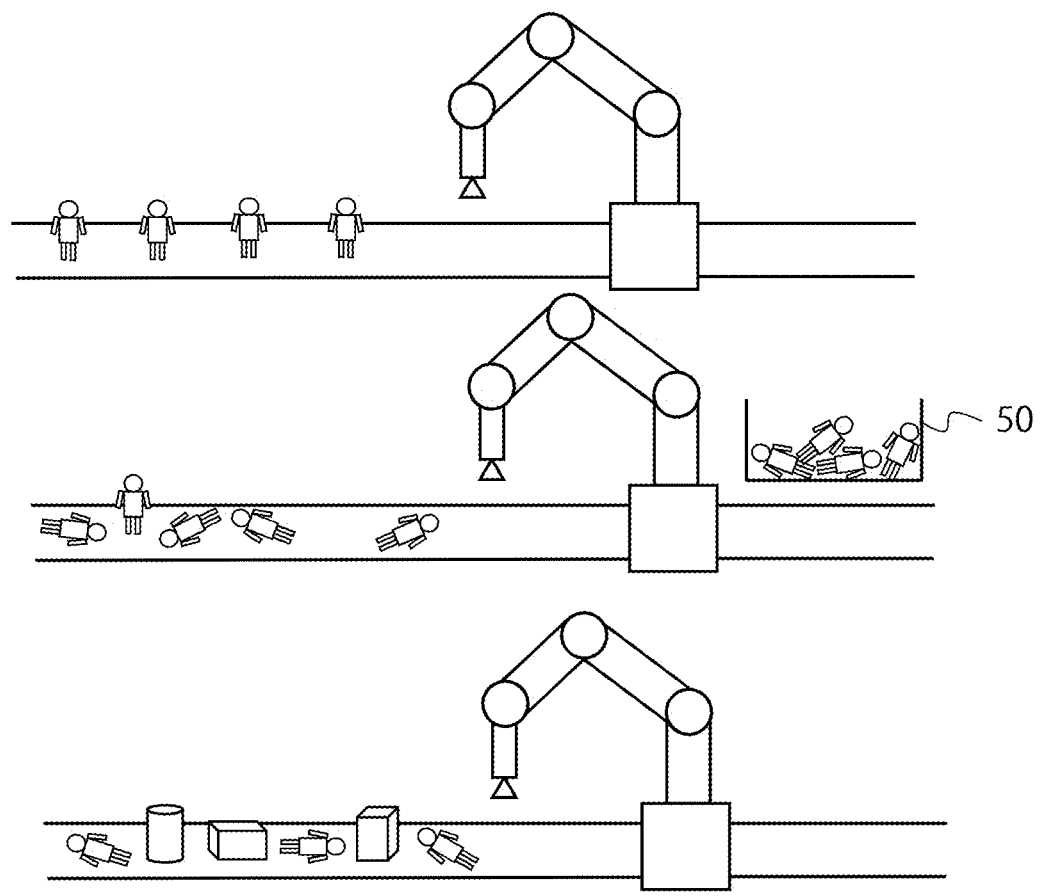
FIG. 3 is a diagram showing a robot according to the first embodiment applied to cargo handling tasks.

FIG. 3 shows an example of the robot 40 being applied to cargo handling. In the example illustrated in the upper side of FIG. 3, a plurality of dolls is aligned orderly on the conveyor belt, facing the same direction. The conveyor belt moves from the left side to the right side. If the robot detects dolls within the vicinity of the robotic hand, the robot can execute the gripping operation to the specified coordinates. Thus, the robot can grip and lift the dolls. The coordinates can be configured to the location of the abdomen, which is the center of gravity for the doll. There could be multiple coordinates (locations) for gripping the dolls.

If the dolls are always aligned orderly, facing the same direction, it is possible to execute cargo handling tasks without executing complicated image recognition processes.

In the example shown in the middle of FIG. 3, a plurality of dolls is located in random locations and faced to different directions. Some dolls are standing while some dolls are lying on the belt. In such cases, the robot needs to specify the gripping location of each doll. Then, the robot needs to move the robotic hand to the corresponding coordinate. Since the gripping location depends on the doll, image recognition is needed, in order to specify the gripping location for each doll.

A plurality of dolls is stacked randomly in a basket 50 which is located in the right hand side of the robotic hand. The whole shape for some of the dolls cannot be recognized visually from the outside. In order to grip the dolls stacked in the basket 50 by the robotic hand, image recognition is needed.

In the bottom of FIG. 3, canned juice in cylindrical form and boxes are located on the conveyor belt, other than dolls. The dolls are not aligned and are mixed with objects of different shapes. In this case, the shapes of the objects need to be distinguished by image recognition. Then, according to the shapes of the objects, the gripping locations need to be specified. Here, the gripping location is an example of the specific region, which is a part of objects.

The image of the target object needs to be taken by a camera before estimating the gripping location (specific region of object) by image recognition. Next, the gripping location within the object (the location of the specific region within the object) is estimated by using the image. Estimation has to be executed successfully for different directions and different alignments of the target object. Also, estimation has to be executed for cases when a part of the object is not visible. Thus, taking the doll as an example, the relative positions of the heads, the hands and the feet need to be determined, to specify the location of the abdomen, which is the gripping location.

To specify the gripping location (specific region of object), a model for image recognition needs to be prepared. Namely, multiple training images that are segmented need to be prepared. Namely, specific parts of the body including the head, the hands, the feet or the like are segmented in the training images, making the parts distinguishable from other regions. By using machine learning or deep learning, the image recognition models can be generated. Training images need to include multiple views of the object from different angles. Also, if the canned juice in cylindrical form and boxes also need to be gripped, image recognition models for other objects need to be generated. The robot applies the model to the image taken by the camera to estimate the gripping location (specific region of object).

By using the method described above, the robotic hand can grip objects, regardless of the direction and location of objects. The robotic hand illustrated in FIG. 3 is a robotic hand with a suction cup. However, robotic hands of different forms or types may be used.

The three-dimensional imaging device 10, the image processing device 20 and the characteristic learning device 30 in FIG. 1 can be used to generate the aforementioned image recognition models for each object. Thus, the system according to the embodiment is a combined system including an image recognition system and a cargo handling system. Detailed explanations on the devices included in the system are given later.

Next, overviews of the devices belonging to the system are described.

The three-dimensional imaging device 10 is a device which generates the distance images of the objects by taking images from multiple angles. For example, by adjusting the angles by 1, 2, 5 or 10 degrees within the range of $2\pi$ steradians, multiple distance images for an object could be taken. By adjusting the angles, few hundred distance images to millions of distance images (multi-view images) can be obtained.

Distance images (depth images) are three-dimensional images including the depth information of objects. The solid angle, which is the scope of images and the units of adjustment for the angle can be determined based on the shape of the object and the region of the gripping location. The solid angle and the units of adjustment for the angle described above are only examples. Different values may be used for the sake of adjustment.

The angle for taking the distance images are determined so that the three-dimensional shape of the target object can be recognized. If there is only a single distance image corresponding to a single angle for an object, it is not possible to recognize the shape of the opposite side, which is not visible from the angle. Thus, information on the shapes of the object viewed from different angles is collected taking the distance images from multiple angles.

Comparing an object which is asymmetric with complicated bumps (concavities and convexities) to an object which has rotational symmetry, the former object requires more distance images to recognize the three-dimensional shape. As mentioned later, multiple distance images taken from multiple angles are combined to generate a CAD model representing the three-dimensional shape of an object.

As mentioned later, the three-dimensional imaging device according to the embodiment has mechanisms to rotate the target object and mechanisms to move the three-dimensional image sensor along an arc trajectory, for taking the distance image of objects.

Figure 4:
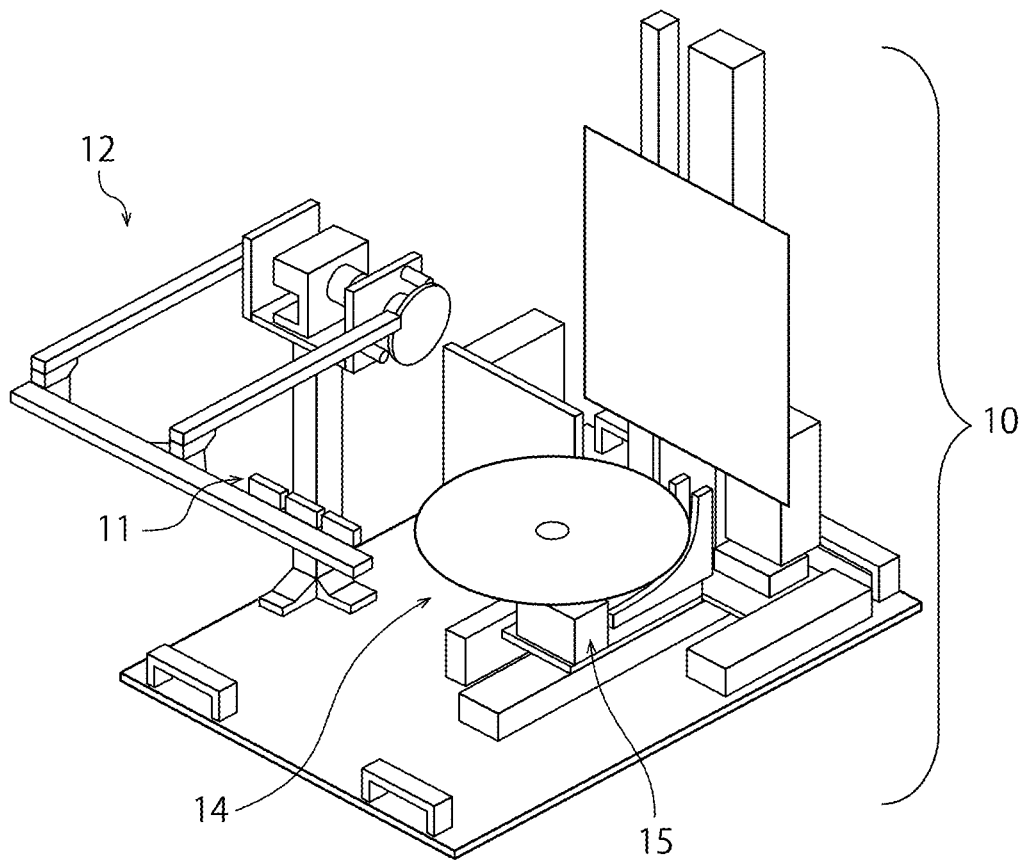
FIG. 4 is a diagram showing the structure of a three-dimensional imaging device according to the first embodiment.

FIG. 4 shows the structure of a three-dimensional imaging device according to the embodiment. However, FIG. 4 is only an example. Other methods can be employed to take distance images of objects. For example, while the location on the target object can be fixed, there could be a mechanism to move the location of the three-dimensional image sensor.

The image processing device 20 generates a CAD (computer-aided design) model with the same angle as the distance image of an object taken by the three-dimensional imaging device 10. Also, the image processing device 20 uses the CAD model of the whole object to generate an image showing the gripping location of the objects.

The characteristic learning device 30 generates a model for recognizing the gripping location within an object by learning the distance image of an object and an image showing the gripping location of an object. The learning of the model can be done by using deep learning such as back propagation methods or machine learning such as SVM (Support Vector Machines) or the like. The distance image of the object and the image indicating the gripping location of the object are used as the teacher data in learning.

The image processing device 20 and the characteristic learning device 30 are information processing systems such as computers with one or multiple CPUs (Central Processing Units), a storage device, a communicating unit. At least one OS (operating system) and applications can operate on the image processing device 20 and the characteristic learning device 30.

In the example of FIG. 1, the image processing device 20 and the characteristic learning device 30 are different devices. However, the features of the image processing device 20 and the characteristic learning device 30 can be implemented in the same information processing device such as computers.

The image processing device 20 and the characteristic learning device 30 can be implemented with physical computers. The image processing device 20 and the characteristic learning device 30 can be also implemented with a virtual machine (VM), a container or a combination of the above. The features of the image processing device 20 and the characteristic learning device 30 can be distributed to a single or a plurality of physical computers, virtual machines or containers. For the sake of availability and load-balancing, the number of image processing devices 20 and the characteristic learning devices 30 may be increased.

The robot 40 is a robot which grips the object and executes cargo handling tasks and assortment tasks. The robot 40 takes an image of the object with an image sensor. Then, based on the image recognition model generated by the characteristic learning device 30, the gripping location of the object is specified. The image recognition model includes a model that detects a certain object (object detection model) and a model that detects a region of an object (semantic segmentation model). First, by using the object detection model, the type of object is specified based on the shape which is indicated in the image. Then, by using the semantic segmentation model corresponding to the type of object, the coordinates of the gripping location is specified. The robot 40 has a robotic hand. The actual transportation task is carried out by the robotic hand.

Figure 5:
FIG. 5 is a diagram showing a coffee cup and gripping locations.

FIG. 5 shows a coffee cup which is used in the description of the embodiment. If the robot 40 has a robotic hand which grips objects by pinching operations, the edge of the coffee cup and the handle of the coffee cup is the gripping location. The coffee cup shown in FIG. 5 is only an example. The system according to the embodiment can be applied to objects with different shapes.

The three-dimensional imaging device 10 and the image processing device 20 can send or receive data via electrical connections or wireless communication. Examples of standards for electrical connections include PCI Express, USB, UART, SPI, SDIO, serial ports, Ethernet or the like. However, other standards may be used. Examples of wireless communication standards include wireless LAN such as IEEE 802.11 series or successor standards, Bluetooth or the like. However, other standards could be used.

To have the three-dimensional imaging device 10 and the image processing device 20 operate cooperatively, the aforementioned data communication feature is required. However, if the three-dimensional imaging device 10 and the image processing device 20 does not operate cooperatively and data is exchanged by using detachable storage media, the connection between the three-dimensional imaging device 10 and the image processing device 20 is not needed. In such cases, the data communication feature is not necessary. Details on the cooperative operation of both devices are mentioned later.

The characteristic learning device 30 and the robot 40 can send or receive data via electrical connections or wireless communication. Examples of standards for electrical connections include PCI Express, USB, UART, SPI, SDIO, serial ports, Ethernet or the like. However, other standards may be used. Examples of wireless communication standards include wireless LAN such as IEEE 802.11 series or successor standards, Bluetooth or the like. However, other standards can be used.

Next, the components of each device are described. The three-dimensional imaging device 10 includes an imaging unit 11, an arm 12, an image storage 13, a platform 14, an actuator 15, an imaging controller 16. FIG. 4 shows an example of the three-dimensional imaging device 10. In FIG. 4 each of the components within the three-dimensional imaging device 10 are shown, except the imaging controller 16.

The imaging unit 11 is a camera which has a three-dimensional image sensor (distance image sensor) obtaining the depth information (distance image) including the distance between the sensor and the subject plus the shape of subject. An example of the three-dimensional image sensor includes a ToF sensor. ToF (Time of Flight) sensors radiate electromagnetic waves such as infrared rays or visible light to the subject. Then, the ToF sensor detects the reflected waves. Based on the time of radiation and the time when the reflected waves were received, the depth information could be calculated. RGB-D (Red, Green, Blue, Depth) sensors which detect both the color and the depth information can be used. As long as the depth information of the object can be obtained, other methods such as pattern light projection method, stereo cameras or the like could be used.

The imaging unit 11 saves the data of the distance image including the depth information in the image storage 13. One example of the format of distance image is the 3D point cloud data which is a set of points in three-dimensional orthogonal coordinates. If the color of the object was obtained by RGB-D sensors or the like, the 3D point cloud data may include patterns in the surface of the object or colors (textures). Also, the imaging unit 11 can save a separate color image besides the distance image including the 3D point cloud data.

3D point cloud data can be raw data from the three-dimensional image sensor. Also, it can be data with the noise components filtered out. As long as the three-dimensional shape of the object can be represented, other data formats including wire frame models, surface models, solid models, polygons or the like may be used. In the following, the 3D point cloud data includes all the data formats which can represent the three-dimensional shapes of objects.

Figure 6:
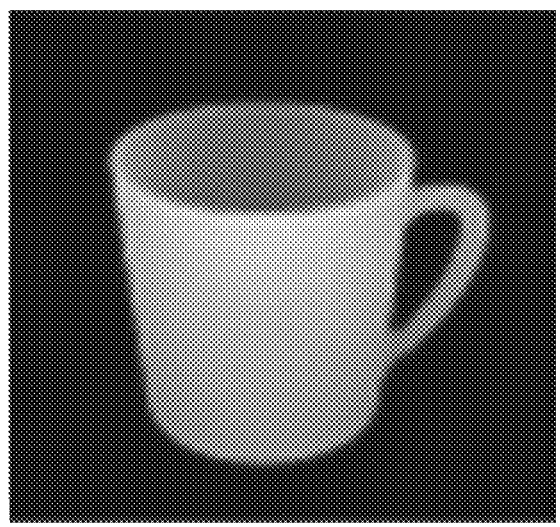
FIG. 6 is an example of a distance image obtained by a three-dimensional image sensor.

FIG. 6 shows an image of a coffee cup taken by a ToF three-dimensional image sensor. Since ToF sensor itself cannot obtain color information, the pictures illustrated on the surface of the original coffee cup is not shown in FIG. 6.

If sensors such as RGB-D sensors which can take color information are used, color images can be obtained besides the distance images. Also, the color information can be included in the distance images. For example, if the target object (the subject) has rotational symmetry and without information on the color and the patterns, it is difficult to determine the direction of the object, it is possible to use color images. Color images could be also used when the areas with drawings need to be excluded from the gripping location.

The arm 12 supports the imaging unit 11 to a height sufficient for taking an image of the object. The arm 12 can adjust the location of the imaging unit 11 in either of the positions along an arc. In the example shown in FIG. 4, the arm 12 is shown in the left side of the three-dimensional imaging device 10. The imaging unit 11 is mounted on the tip of the arm 12. The arm 12 supports the imaging unit 11 to the position for taking images. The arm 12 has a rotational mechanism which enables the rotational movement of the imaging unit 11. The arm 12 can have a height adjusting mechanism to accommodate target objects (subjects) of different sizes. The arm mechanism shown in FIG. 4 is only an example. Other mechanisms can be used to adjust the position of the imaging unit 11.

The image storage 13 stores multiple distance images (multi-view images) taken by the imaging unit 11. The distance images saved in the image storage 13 need to be accessible from the image processing device 20. The image storage 13 can be configured so that it is directly accessible from the image processing device 20. The image storage 13 could be detachable storage media. After the images of the object are taken, the storage media can be moved from the three-dimensional imaging device 10 to the image processing device 20.

The image storage 13 can be volatile memory such as SRAM, DRAM or the like. The image storage 13 can also be nonvolatile memory such as NAND, MRAM, FRAM or the like. Storage devices such as optical discs, hard discs, SSDs or the like may be used. In the example shown in FIG. 1, the image storage 13 is located within the three-dimensional imaging device 10. However, the image storage 13 can be located in outside of the three-dimensional imaging device 10. Thus, the image storage 13 can be placed in any location. For example, the distance image can be saved in an external storage device, an external server, cloud storage or the image processing device 20.

The platform 14 is a location to place the object which is the subject of the imaging unit 11. In the example shown in FIG. 4, the platform 14 is a flat disk-shaped. To reduce the reflection of light, the surface is black. The platform 14 is mounted on the actuator 15. The platform 14 can rotate horizontally by the function of the actuator 15. Since the object placed on the platform 14 also rotates, it is possible to take images of the object from different angles.

The actuator 15 is a rotary actuator which rotates the platform 14. The rotary actuator can be electric or hydraulic. The rotary actuator can operate based on any mechanism. In addition to the rotary actuator, an actuator which enables vertical movement can be combined to make the height of the platform 14 adjustable.

The imaging controller 16 controls the imaging unit 11, adjusts the location of the arm 12, and rotates the actuator 15, enabling the generation of multiple distance images (multi-view images). Also, the imaging controller 16 sends instructions to take multiple distance images based on the information on the angles and views.

For example, if the information on the angles and views include 810 combinations of angles and views, 810 distance images are taken. The combinations of angles and views could be configured manually by the users. Based on the size of the object, the imaging controller 16 can generate the combinations of angles and views automatically. Also, the control program running on an external computer (not shown) can configure the information on the angles and views.

The information on the angles and views could be included in the 3D point cloud data. The information on the angles and views could be saved as a separate data or file. The information on the angles and views is shared with the image processing device 20. As mentioned later, the image processing device 20 generates the three-dimensional model of the object based on the 3D point cloud data and the information on the angles and views.

The image processing device 20 includes a view synchronizing unit 21, a CAD model generator 22, a CAD model storage 23, a displaying unit 24 and an input unit 25. The CAD model generator 22 has a gripping location specifying unit 22a as an internal component.

The view synchronizing unit 21 obtains the information on the angles and views used for taking distance images in the three-dimensional imaging device 10. The information on the angles and views are used for generating computer graphics in the CAD model generator 22. The information on the angles and views are sent via the electrical connection or by wireless communication between the three-dimensional imaging device 10 and the image processing device 20. By using detachable storage media, the information on the angles and views can be moved or copied from the three-dimensional imaging device 10 to the image processing device 20.

The CAD model generator 22 generates a three-dimensional model representing the three-dimensional shape of the object by combining multiple distance images taken from multiple angles in the three-dimensional imaging device 10. Examples of the three-dimensional model include three-dimensional CAD (Computer-Aided Design), three-dimensional CG (Computer Graphics). However, as long as the three-dimensional shape of the object can be represented, any type of file or any format can be used. Since multiple distance images are combined to generate the three-dimensional model, the three-dimensional model needs to represent the accurate external form of the object, for angles that can be viewed from the three-dimensional imaging device 10. The generated three-dimensional model is saved in the CAD model storage 23.

The CAD model generator 22 can be implemented with three-dimensional CAD software, 3D-CG software, vector graphics editors, image processing software or the like. If three-dimensional CAD software is used, the CAD model generator 22 can use the feature of the software to generate the three-dimensional model based on the 3D point cloud data of each distance image.

If the information on colors is also obtained, a three-dimensional model with color information could be generated. Also, the user can manipulate the three-dimensional CAD software, generating the three-dimensional model manually. The user could also edit the three-dimensional model which has been generated automatically.

It is possible to accelerate the overall process if the three-dimensional model is generated automatically, without the manipulation of the users. If the noise components in the distance images are relatively large and the accuracy of the 3D point cloud data is limited, the quality of the three-dimensional model can be improved by the manipulation of the users. If the user edits the three-dimensional model, it is possible to add information such as the composition of each region for the object, which cannot be obtained by the three-dimensional image sensors.

The 3D point cloud data used for generating the three-dimensional model can be obtained by the electrical connection or wireless communication between the three-dimensional imaging device 10 and the image processing device 20. By using detachable storage media, the 3D point cloud data generated by the three-dimensional imaging device 10 can be moved or copied.

The gripping location specifying unit 22a can automatically specify the location of specific regions within each three-dimensional model, including the gripping locations. The task of specifying the location of an area within the object is a form of regional segmentation. Such tasks are called the annotation of images. The gripping location specifying unit 22a according to the embodiment generates images that specify the gripping location (region) for each three-dimensional model. The images which indicate specific regions of the object, such as the gripping location are called the extracted images in the following. As mentioned below, the specified regions could be any region as long as the region is within the object. Thus, specified regions could be regions other than the gripping locations. The type of target object and the specified areas (locations) could be determined based on the purpose and scope of image recognition. As long as image recognition can be applied to the object, any type of object could be the target object. Objects could be living creatures or organisms.

The extracted images generated by the gripping location specifying unit 22a can be combined with the distance images, forming teacher data (ground truth) for learning the image recognition models. Each image used as the teacher data is called the teacher image in the descriptions below. The teacher data could be a pair of an extracted image and the corresponding distance image. The teacher data could be distance images that are marked making the regions specified in the extracted images distinguishable from other regions.

In this case, the marking of the regions could be done by setting attribute information to the corresponding pixels in the image, for example. It is possible to set specific colors or tones to the corresponding points or pixels. Any method can be used for marking regions. A plurality of training images can be saved in the CAD model storage 23. The feature of the gripping location specifying unit 22a could be implemented using three-dimensional CAD software running on the image processing device 20, for example.

FIG. 7 shows the task for specifying the gripping location manually. There have been cases where the region corresponding to the gripping location was specified manually by hand for multiple images, as shown in FIG. 7. In the example shown in FIG. 7, the boundaries of the regions are specified by hand-written lines. However, the lines do not match with the actual handle and the edges. Thus, the images shown in FIG. 7 are inaccurate annotation images.

If there are more than hundreds of images, the amount of work required to specify the regions may become extensive. If different members are involved in the task of annotation, the qualities of the training images in the teacher data may vary, depending on the member who was in charge of the annotation for the image. Thus, the accuracy of the image recognition may deteriorate.

FIG. 8 shows the task of specifying the gripping location according to the embodiment. According to the embodiment, if a region is specified in a single three-dimensional model, it is possible to obtain the 3D point cloud data for the specific region. Thereafter, only by entering the 3D point cloud data for the specific region to other three-dimensional models, it is possible to generate an image showing the gripping location viewed from a different angle. By repeating this procedure to the three-dimensional models for each angle, it is possible to generate the annotation images for different angles (views), automatically.

Thus, regardless of the number of images in the teacher data, the manual work required for annotation task will be constant. If the first annotation image is sufficiently accurate, it is possible to maintain the quality of the overall teacher data.

The task of specifying the gripping location (area) for the first time could be done manually, by having the user manipulate the three-dimensional CAD software. Also, programs, scripts, macros can specify the gripping location (area) under predetermined conditions for the gripping location (area). If the gripping locations need to be specified for multiple objects with different shapes, it is possible to shorten the time necessary to generate a model for recognizing objects, by using the later method.

Below, the procedure for specifying the gripping locations by using programs, scripts and macros under predetermined conditions are explained.

If the gripping location of the objects are specified, not only the shape of the object but also the robotic hand which is used need to be taken into consideration. For example, if the diameter of the suction cup in the robotic hand is three centimeters, a circular area with a diameter of three centimeters is searched within the three-dimensional model. The identified area can be used as the gripping location of the object. If multiple areas have been identified, the region which is closer to the center of the object is chosen.

If he robotic hand is a 2-finger gripper with maximum opening width of two centimeters, edges or protrusions with a width of two centimeters or smaller is searched within the three-dimensional model. The robotic hand can sandwich such edges or protrusions. During the search, it is possible to impose conditions such as the area of the edges or protrusions, whether there are some patterns or not. Also, depending on the specification of the 2-finger gripper, it is possible to set a minimum value to the width of the edge or the protrusion.

If multiple locations are identified, the location with the greatest mechanical strength is selected to reduce the possibility of damage. For example, if there is a protrusion, the protrusion with the shortest length is selected. If there is an edge, the location with the greatest width is selected. It is possible to select multiple locations as the gripping locations. Depending on the position and the location of the objects, there are locations that cannot be gripped.

Also, the gripping location (area) could be specified by finding the relative position for center of the object and the center of gravity from the 3D point cloud data.

If there is information on the composition of the object, such information could be used for the selection of gripping location. For example, locations with insufficient mechanical strength could be excluded from the gripping locations, regardless of the shapes of the regions. Depending on the mechanical strength of the materials, it is possible to configure the priority for selection.

The aforementioned selection of the gripping location for the object, based on the type and specification of the robotic hand could be executed by programs such as three-dimensional CAD software. It is also possible to use scripts, macros or hardware such as customized circuits. Any type of implementation could be used.

Figure 9:
FIG. 9 shows an example of a specified gripping location for a coffee cup.

FIG. 9 is an image showing the result of specifying the gripping location. The image of FIG. 9 corresponds to the coffee cup shown in the distance image of FIG. 6. The distance image of FIG. 6 was in grayscale. However, FIG. 9 is a black and white image without any tones.

By editing the extracted image generated as a three-dimensional model, it is possible to simplify the image to black and white images. The images used for generating the teacher data could be two-value data that does not include depth information or 3D point cloud data. By using simplified data for the extracted images, it is possible to reduce consumption of storage space.

For the extracted images, it is possible to use the 3D point cloud data. It is also possible to use color images including the RGB information. Thus the extracted images are not limited to a specific format.

Next, the descriptions for each component are continued.

The CAD model storage 23 saves the three-dimensional model of the whole object. The CAD model storage 23 also saves the extracted images. Since the data stored in the CAD model storage 23 is used for learning the image recognition model, it needs to be accessible from the characteristic learning device 30. The configuration for shared storage to enable access from the characteristic learning device 30 is not limited. Also, various communication methods could be used. For example, the CAD model storage 23 could be configured as shared storage which is accessible from the network.

The CAD model storage 23 could be volatile memory such as SRAM, DRAM or the like. The image storage 13 could also be nonvolatile memory such as NAND, MRAM, FRAM or the like. Storage devices such as optical discs, hard discs, SSDs or the like may be used. In the example shown in FIG. 1, the CAD model storage 23 is located within the image processing device 20. However, the CAD model storage 23 can be located in outside of the image processing device 20. Thus, the CAD model storage 23 can be placed in any location. For example, the distance image could be saved in an external storage device, an external server or cloud storage.

The displaying unit 24 is a display which can show various information. For example, the displaying unit 24 shows the images of the three-dimensional model, extracted images, distance images or the like. It is possible to confirm the recognized shape of objects. It is also possible to confirm the three-dimensional model which is being edited. Also, it is possible to show information on the object detection model and the semantic segmentation model. The displaying unit 24 helps the generation of models and configuration changes of the models by visual images. It is possible to show a GUI (Graphical User Interface) which accepts operations from the users. The displaying unit 24 could be a liquid crystal display, an organic electroluminescence display or a different display.

The input unit 25 accepts various operations from the users. For example, the input unit 25 enables manipulations of the three-dimensional CAD software, selections of images shown in the displaying unit 24, changes in the presentation of images, instructions to the three-dimensional imaging device 10. The input unit 25 could be implemented with a mouse, a keyboard, a touch panel, a track ball, a joystick, a pen-tablet, or a combination of multiple devices. The input unit 25 could be implemented with a voice recognition device or other devices.

The characteristic learning device 30 includes a learning unit 31, a model storage 32, a model updating unit 33.

The learning unit 31 generates a model used for recognition of images by learning. In the learning process, multiple distance images from multiple angles and the extracted images for the corresponding distance images are used as the teacher data. For example, in the case of a coffee cup, the region corresponding to the edges and the handles are specified for multiple angles, in the extracted images. If the extracted images are scaled to the same size as the distance image for the corresponding angle, it is possible to distinguish the regions corresponding to the edges or the handles to the other regions, in the distance images.

The generated image recognition model includes a model which detects objects (detection model) and a model which detects regions within objects (semantic segmentation model). The detection model finds the location of a specific object within the image.

In the embodiment, the target object of the detection model is the coffee cup in the image. Applications of the detection model include facial recognition and pedestrian detection. The semantic segmentation model categorizes each pixel of the images into classes. In the embodiment, it is determined whether each pixel in the image belongs to the gripping location or some other region.

The model includes both the model for detecting the shape of an object and the model which executes the semantic segmentation of images.

The learning unit 31 learns the detection model and the semantic segmentation model for each shape of the target object which is gripped. For example, if coffee cups, dolls, canned juice and boxes are included in the target for gripping, the detection model and the semantic segmentation model are generated for each shape of object. If objects of different shapes are added to the target for gripping, it is possible to execute the learning process again for the new shape of object.

For example, if a plastic bottle is added to the target object for gripping, the detection model and the semantic segmentation model for the plastic bottle is learned. If there are variations in the same type of object (for example, coffee cups) it is possible to learn only a typical shape of the object. The variations include concavities, convexities, the ratio between the height and the width, the size and patterns. In this case, a typical shape of the coffee cup is learned in this case.

The images of the teacher data used for generating the models could be distance images. It is also possible to use both the distance images and color images.

The learning of models could be done using various methods of machine learning. Examples of machine learning include deep learning, support vector machines or the like. Specific examples of deep learning include back propagation methods for neural networks. If it is possible to learn models using the teacher data, other methods could be used for learning.

Figure 10:
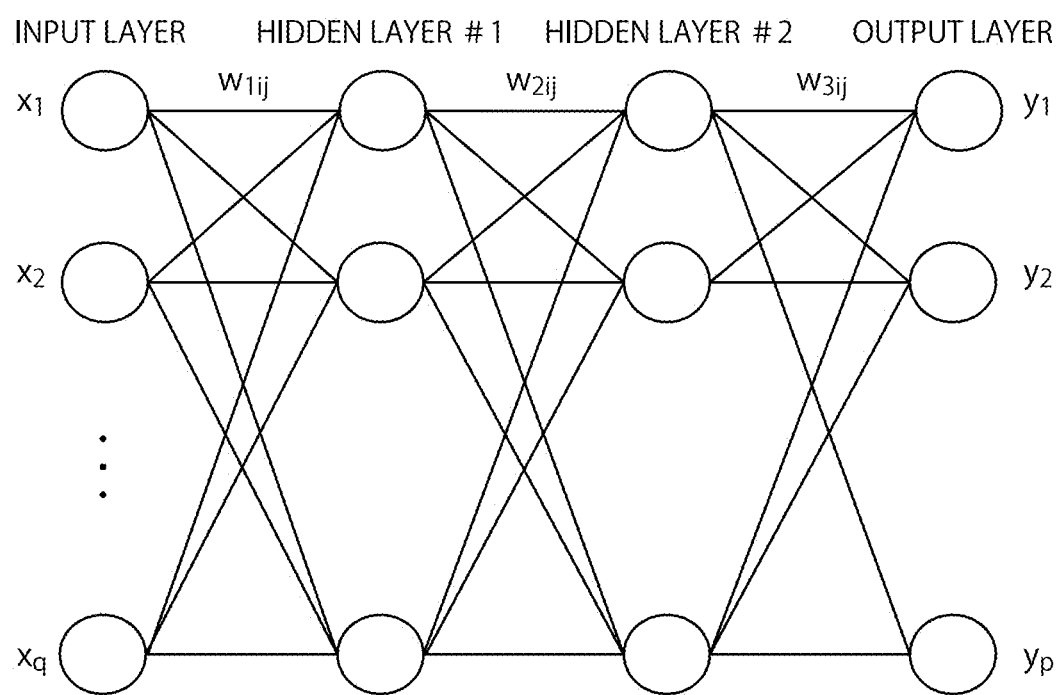
FIG. 10 is a diagram showing an example of a neural network used in deep learning.

Learning methods that use multi-layer neural networks are called deep learning. FIG. 10 shows an example of a neural network. The number of layers in the neural network shown in FIG. 10 is four. However, the number of layers could be different. In the following, an overview of deep learning is explained.

Figure 11:
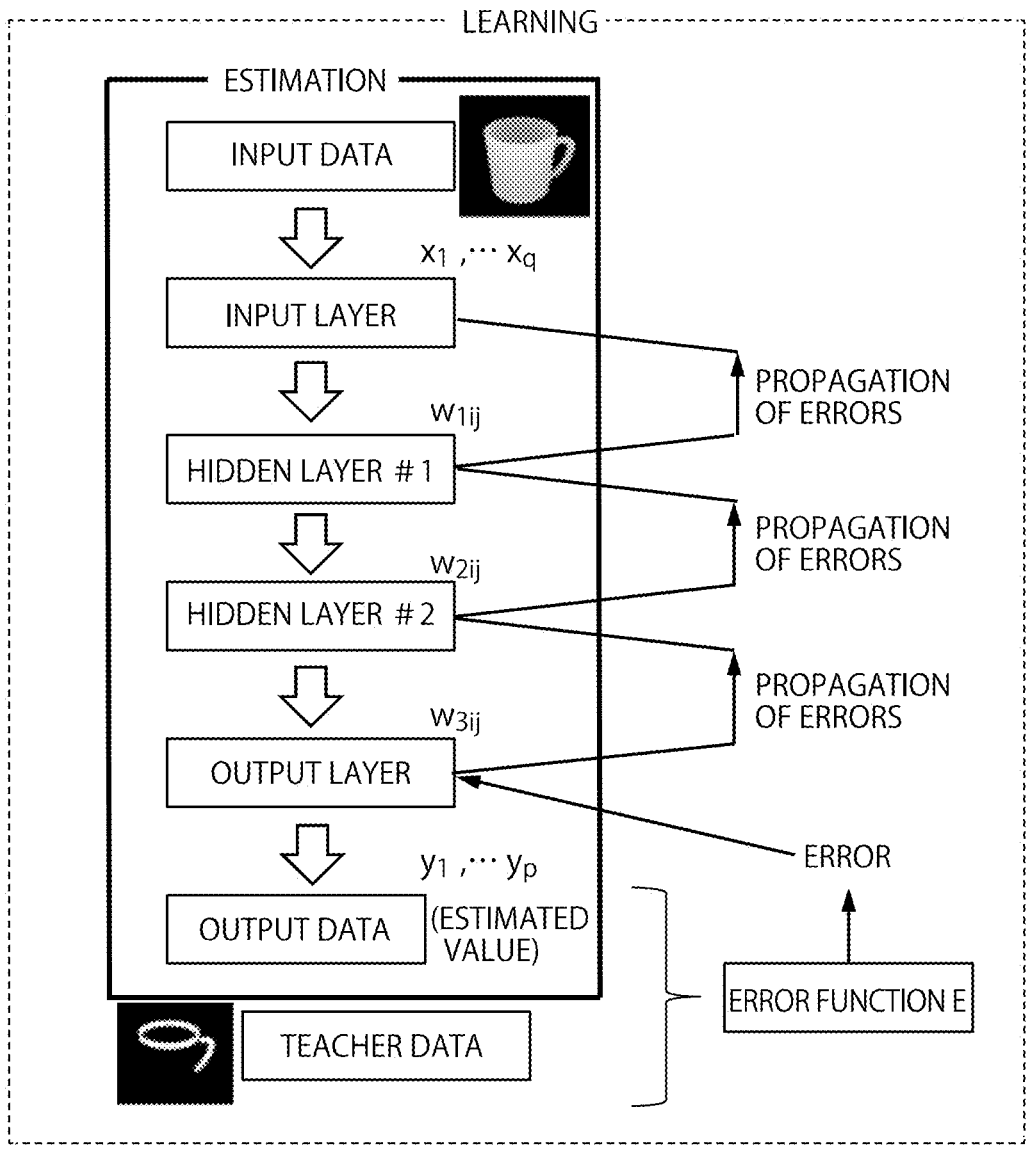
FIG. 11 is a diagram showing an example of the back propagation method for a neural network.

FIG. 11 is an example of deep learning with neural networks. The input data $(x_1, x_2, \ldots, x_q)$ are transferred from the input layer to the hidden layer. One example of the input data is images. The input data is multiplied by the coupling weight $w_{nij}$ between each layer. Then, the output data $(y_1, y_2, \ldots, y_p)$ is generated. Here, $x_j$ is the feature value in the input data. $y_j$ is the feature value in the output data. q is the number of feature values that is in the input data. p is the number of feature values that is in the output data. n is the number of layers in a neural network minus 1. In the example shown in FIG. 10 and FIG. 11, the relation n=1, 2, 3 holds.

The error E between the output data and the teacher data could be represented by using the error function (loss function). For the error function, the equation (1) shown below which is the sum of the square errors for each feature value could be used.

$$E = \frac{1}{2}\sum_{j=1}^{p}(r_j - y_j)^2 \quad (1)$$

Here, $r_j$ is each feature value in the teacher data. The equation (1) shown above is only an example. Different error functions may be used.

In the back propagation method, the error E is transmitted to each layer from the inverse direction. The coupling weight is adjusted to ensure that the error E is minimized. If the gradient descent method is used, the adjustment of the coupling weight, the calculation of error and the calculation of adjusted amount repeated until the error E approaches 0. The adjusted amount of coupling weight can be represented in the equation (2) below. Below, the generalized coupling weight is w.

$$\Delta w = -\eta \frac{\partial E}{\partial w} \quad (2)$$

Here, $\Delta w$ is the adjusted amount and $\eta$ is the learning coefficient. If the error is a function of w and the slope is positive, the coupling weight is decreased. If the error is a function of w and the slope is negative, the adjusted amount is set to a positive value, increasing the coupling weight. The learning coefficient $\eta$ is adjusted so that the error E converges to 0. It is possible to adjust the learning coefficient $\eta$ by using methods such as Adadelta and AdaGrad. In multi-layer neural networks shown in FIG. 10, the adjustment of coupling weight by equation (2) is executed from the coupling weight neighboring the output layer.

Since the output y is a parameter of the error function, equation (2) could be represented as the derivative of a composite function. For example, differentiation by the coupling weight $w_{3ij}$ yields the following equation (3).

$$\frac{\partial E}{\partial w_{3ij}} = \frac{\partial E}{\partial y_j}\frac{\partial y_j}{\partial u_{3j}}\frac{\partial u_{3j}}{\partial w_{3ij}} \quad (3)$$

Here, $u_{3j}$ represents the input of the node in the output layer, as shown in equation (4), below. $u_{3j}$ is the sum of the coupling weight plus the bias.

$$u_{3j} = \sum_{i}^{p} w_{ij}\beta_i + b_j \quad (4)$$

Here, $\beta_i$ represents the output of each node in the hidden layer #2, which is located immediately before the output layer. Also, $b_j$ is the bias. The equation (4) is a function which can be differentiated with $w_{3ij}$.

Since the output $y_i$ is a function of $u_{3j}$, equation (3) includes the partial derivative of the output $y_i$. For the function σ(u) which represents the output $y_i$, a differentiable function needs to be used. Such functions σ(u) are called the activation function. For the activation function, the sigmoid function, the tan h function, the rectified linear unit (ReLU) could be used. However other differentiable functions may be used.

The actual detection of objects and the semantic segmentation of objects is performed by using neural networks whose adjustment of the coupling weight w by back propagation is completed. If the objects are detected, information of each pixel in the distance image is entered into each input node as the feature values. In this case, an image which specifies the pixels corresponding to the object is obtained as the output data. The data entered to the input nodes may take different formats. Other types of data may be entered into the input nodes.

When semantic segmentation is executed, information on each pixel of the distance image and information on each pixel of the extracted image are entered into each input node as the feature values. In this case, an image with the estimated regions can be obtained as the output data. The data entered to the input nodes may take different formats. Other types of data may be entered into the input nodes.

In FIG. 10 and FIG. 11, a case when the learning unit 31 applied the back propagation method to an ordinary neural network was explained. However, other types of neural networks including the convolutional neural networks (CNNs) may be used. The convolutional neural networks include repetitions of the convolution layer and the pooling layer.

When the learning unit 31 completes the learning of models, the learning unit 31 saves the detection model and the semantic segmentation model in the model storage 32. If neural networks are used, it is possible to determine that the learning is complete when the adjustment of parameters is finished and the error E converges to 0 or a certain value. Adjustable parameters include the configuration of the neural networks, the number of layers in the neural network, the filter size and the number of filters in the convolution layers, the value of the learning coefficients, the number of updates, the selection of the activation function, whether there are drop-outs or drop-connects.

The model storage 32 saves the detection model and the semantic segmentation model for each shape, generated by the learning unit 31. The model storage 32 could be volatile memory such as SRAM, DRAM or the like. The model storage 32 could also be nonvolatile memory such as NAND, MRAM, FRAM or the like. Storage devices such as optical discs, hard discs, SSDs or the like may be used. In the example shown in FIG. 1, the model storage 32 is located within the three-dimensional imaging device 10. However, the model storage 32 could be located in outside of the characteristic learning device 30. Thus, model storage 32 can be placed in any location. For example, the distance image could be saved in an external storage device, an external server or cloud storage.

The model updating unit 33 provides the newly learned detection model and semantic segmentation model to the robot 40. The learned model could be provided to the robot 40 using various methods.

For example, the model updating unit 33 can send the data of the models to the robot 40, when the model updating unit 33 detects the generation of the detection model and the semantic segmentation model for an object of a new shape. Also, the model updating unit 33 can simply notify the robot 40 that the learning process of models for a new shape has been completed. The robot 40 can determine whether it will download the data for the learned models or not.

With the help of the model updating unit 33, the robot 40 can grip objects of new shapes. If the detection model and the semantic segmentation model for shapes of objects the robot 40 could grip are updated, the model updating unit 33 can send the updated models to the robot 40.

The robot 40 includes a robotic hand 41, a camera 42, a model storage 43 and an image recognition unit 44.

The robotic hand 41 is a robotic hand which can grip and transport objects. The structure, the size and mechanism of the robotic hand 41 is not limited. The objects could be gripped by pinching or by suction cups, but other mechanisms may be used.

The example of tasks performed by the robotic hand 41 includes, removing objects from the belt conveyors or baskets, transportation of objects and assortment of objects. However, other tasks could be handled, as well. Examples of objects that are gripped by the robotic hand include industrial products, packaged goods, food, and material such as metal or woods. However, organisms such as crops or fishery can be handled, as well. Thus, the objects that are handled are not limited to objects of a specific category.

The camera 42 takes images that are needed for recognizing objects the robot 40 grip. The three-dimensional image sensor implemented in the camera 42 has similar features as the three-dimensional image sensor implemented in the imaging unit 11 of the three-dimensional imaging device 10.

For example, if the detection model and the semantic segmentation model were generated by using the distance images taken by the imaging unit 11, the camera 42 needs to be a device which can obtain distance images with characteristics similar to that of the imaging unit 11. If both the distance images and the color images are taken at the imaging unit 11, and both types of images are used for the learning of models, the camera 42 needs to be a camera which can obtain both the distance images and the color images. For the three-dimensional image sensor of the camera 42, it is possible to use ToF sensors or RGB-D sensors, for example.

In the example shown in FIG. 1, the camera 42 mounted on the robot 40 is used for taking images of objects. However, it is possible to use images taken by cameras located outside of the robot 40.

The model storage 43 saves the detection models and the semantic segmentation models learned at the learning unit 31 of the characteristic learning device 30. In the model storage 43, the models that are learned for each shape of the objects that are gripped are saved. The model storage 43 could be volatile memory such as SRAM, DRAM or the like. The model storage 43 could also be nonvolatile memory such as NAND, MRAM, FRAM or the like. Storage devices such as optical discs, hard discs, SSDs or the like may be used. In the example shown in FIG. 1, the model storage 43 is located within the robot 40. However, the model storage 43 can be located in outside of the robot 40. Thus, model storage 43 could be placed in any location. For example, the distance image could be saved in an external storage device, an external server or cloud storage.

The image recognition unit 44 manipulates the camera 42. By using the learned models, the image recognition unit 44 can detect objects and specific regions within the objects. Also, based on the result of the detection of regions within the object, the robotic hand 41 is controlled, enabling the gripping and transportation of objects. The image recognition unit 44 can use the detection models and the semantic segmentation models saved in the model storage 43. The image recognition unit 44 can also use models saved in storage space outside of the robot 40. For example, the image recognition unit 44 can refer to the model storage 32 in the characteristic learning device 30 and use model saved in the model storage 32.

Also, the image recognition unit 44 manages the detection models and the semantic segmentation models saved in the model storage 43. Specifically, if the model updating unit 33 in the characteristic learning device 30 sends data for models learned for new shapes, the image recognition unit 44 receives the corresponding data. Then, the received data is saved in the model storage 43. When the image recognition unit 44 receives a message implying that new models are learned by the model updating unit 33 in the characteristic learning device 30, the data for the corresponding models are downloaded from the model storage 32. Then, the downloaded data is stored in the model storage 43.

The image recognition unit 44 may have storage space such as memory, buffer, cache or the like to save working data temporary for controlling the robotic hand 41. Working data includes images and coordinate information used in object detection and detections of regions within the objects. The image recognition unit 44 could be located within the body of the robot 40. The image recognition unit 44 could be also located in an external computer located outside of the body of the robot 40.

The features of the imaging controller 16 in the three-dimensional imaging device 10, the components in the image processing device 20, the components in the characteristic learning device 30 and the image recognition unit 44 in the robot 40 could be implemented with processing circuits. Processors such as the CPU (Central Processing Unit) are examples of the processing circuit. On the CPU, software (programs) can operate, realizing the aforementioned features. The processing circuits could be hardware circuitry such as FPGAs, ASICs or the like. Also, combinations of the aforementioned methods may be used to implement the above features in the processing circuits.

Figure 12:
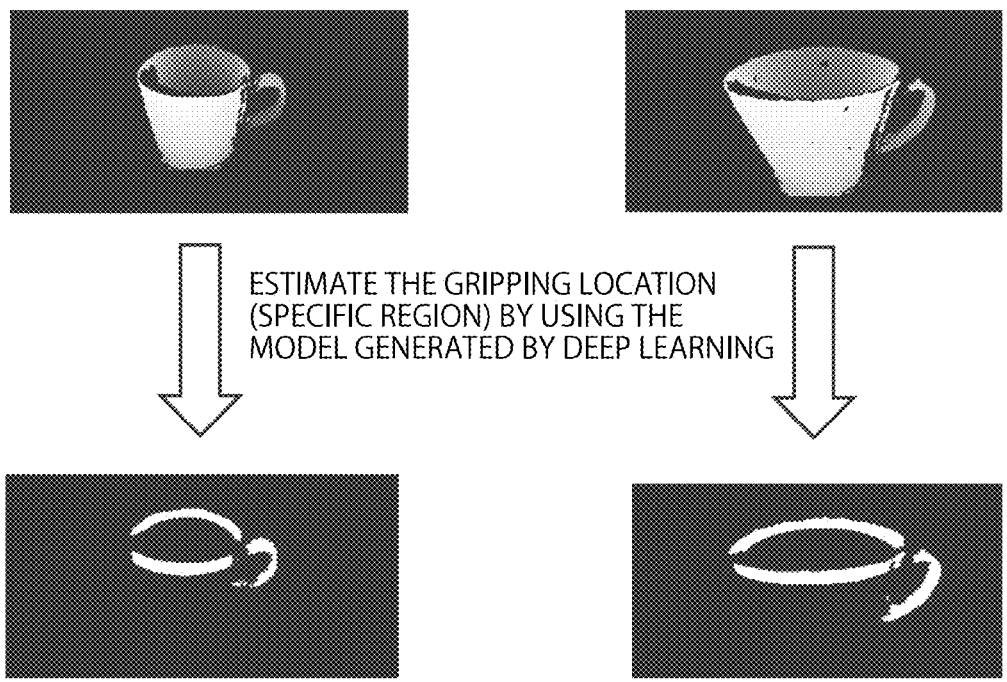
FIG. 12 shows examples of estimated gripping locations for coffee cups by deep learning.

FIG. 12 shows the estimated gripping locations for coffee cups by deep learning. If the robot 40 can detect regions within the object, it is possible to obtain images shown in FIG. 12, and estimate the gripping locations of the coffee cup.

The actual images obtained by the three-dimensional image sensors may include noise components. In the top of FIG. 12, a distance image for a small coffee cup and a distance image for a large coffee cup are shown. The black regions on each coffee cup correspond to the noise. In the bottom of FIG. 12, the estimated gripping locations for the small coffee cup and the large coffee cup are shown. From the results shown in FIG. 12, it is possible to infer that even though the distance images include noise components, it is possible to estimate the gripping location by using semantic segmentation.

Next the process of the system according to the embodiment is explained. The process of the system could be divided into the tasks for generating the image recognition (object detection, semantic segmentation) models and the tasks executed by the robot. The robot recognizes the image and executes the cargo handling tasks.

Figure 13:
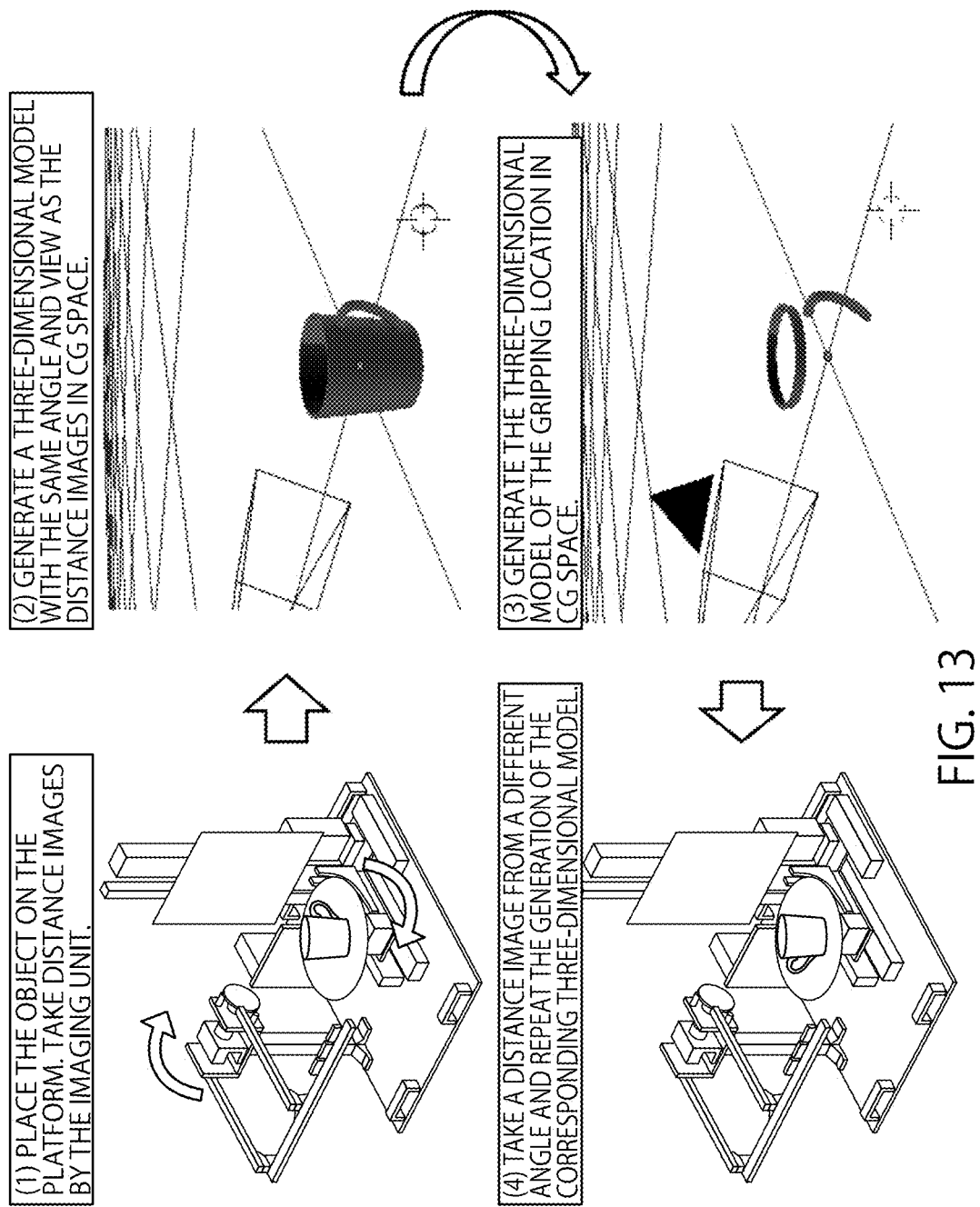
FIG. 13 is a diagram showing an example of cooperative operation between a three-dimensional imaging device and an image processing device.

FIG. 13 shows the coordinated operations of a three-dimensional imaging device 10 and an image processing device 20. In FIG. 13, the generation of image by the three-dimensional imaging device 10 and the generation of the three-dimensional model corresponding to the generated image are executed in an alternating fashion. If communication of data between the three-dimensional imaging device 10 and the image processing device 20 is possible, such coordinated operation could be executed. Coordinated operation of the devices enable the automated generation of the three-dimensional models.

However, the flow shown in FIG. 13 is only an example. The order of execution can be different. For example, the three-dimensional imaging device 10 could take all the multi-view images first. Then, the three-dimensional models corresponding to each image can be generated later. In the following, more details on the coordinated operations of a three-dimensional imaging device 10 and an image processing device 20 are explained.

Figure 14:
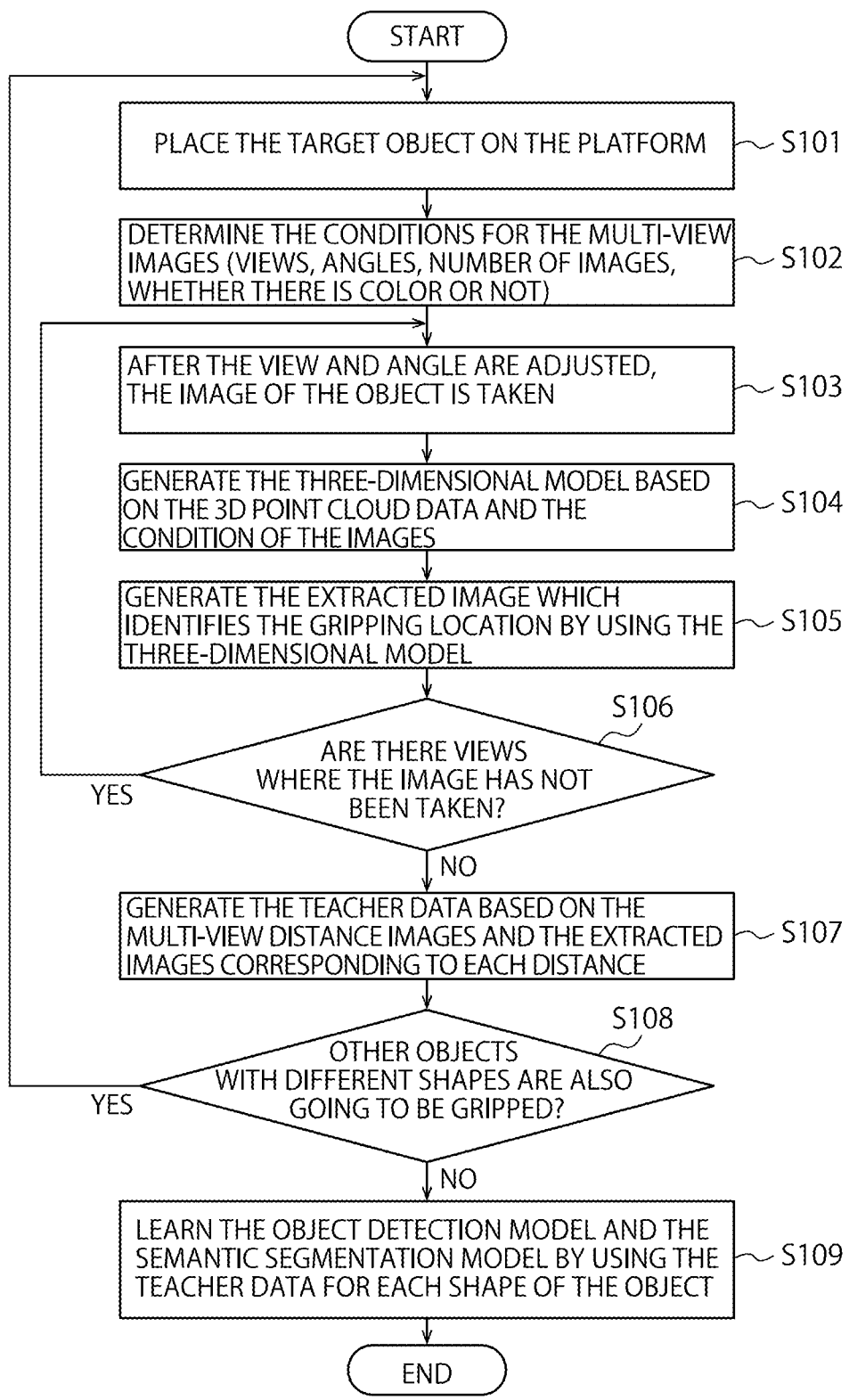
FIG. 14 is a flowchart showing the generation of an object detection model and an semantic segmentation model.

FIG. 14 is a flowchart showing the generation of the object detection model and the semantic segmentation model. In the following, the procedures are explained in reference to FIG. 14.

First, the target object is placed on the platform 14 of the three-dimensional imaging device 10. (Step S101) Here, an object with the exactly same shape and size as the object actually gripped by the robot 40 could be used. Also, a miniature with a different size could be used. Also, if a plurality of objects with similar forms but has differences in the concavities, the convexities and the detailed shapes are going to be gripped, it is possible to use one object which represents the average shape for the plurality of objects.

Thus, if there is a variation of objects with similar forms, the variation of objects could be handled as one shape of object as a whole.

Next, the conditions for the multi-view images (views, angles, number of images, whether there are colors or not) are determined. (Step S102) The condition for the images is determined for each object which is going to be gripped. It is ensured that each image have different angles. Regarding the view, all the images could have views with the width. The size of the views does not have to be uniform. The selection and configuration of conditions for the images have been explained in the description of the imaging controller 16, above.

Then, after the views and angles are adjusted, the image of the object is taken by the imaging unit 11. (Step S103) The views and angles used in this step are the views and angles determined in step S102. The angle could be adjusted by the combination of rotational movement of the platform 14 by the actuator 15 and the movement of arm 12 with the imaging unit 11. If the view is changed, the configuration of the imaging unit 11 needs to be updated.

Based on the 3D point cloud data and the condition of the images, the three-dimensional model is generated. (Step S104) the generation of the three-dimensional model is done by the CAD model generator 22 in the image processing device 20. The CAD model generator 22 combines multiple distance images from multiple angles to generate the three-dimensional model.

Thus, if the three-dimensional model is shown in a display by the CAD software, the accurate three-dimensional shape of the object is presented even if the viewing angle is changed, as long as the viewing angle is within the scope of the images taken by the three-dimensional imaging device 10. Details on the generation of the three-dimensional model have been explained in the description of the CAD model generator 22, above.

Next, the extracted image which identifies the gripping location is generated by using the three-dimensional model. The three-dimensional model is generated by the gripping location specifying unit 22a. (Step S105) Details on the generation of the extracted images have been explained in the description of the gripping location specifying unit 22a.

Next, it is confirmed whether there are views (angles) where the image has not been taken. (Step S106) If images have been taken for all the views that are defined in the conditions, the process can proceed to step S107. If there are views without images, the process returns to step S103. Then, the angle is adjusted to a different view to take another image.

If the generation of the multi-view images and the extracted images for each view is complete, the teacher data is generated based on the multi-view distance images and the extracted images corresponding to each distance image. (Step S107) The generated teacher data is saved in a location that is accessible from the characteristics learning device 30, which executes the actual learning process.

If the teacher data for an object is generated, it is confirmed whether other objects with different shapes are also going to be gripped. (Step S108) If an object with a different shape is specified as the object to be gripped, the process returns to step S101. The procedures after step S101 are repeated for the object with a different shape. If the teacher data for all the shapes are generated, the process can proceed to step S109.

Finally, by using the teacher data for each shape of the object, the object detection model and the semantic segmentation model are learned. (Step S109) Details on the learning process of the object detection model and the semantic segmentation model are explained in the description of the learning unit 31 in the characteristics learning device 30. If the models are generated by learning, the data corresponding to the models could be sent to the robot 40. Also, it is possible to simply notify the fact that models have been generated to the robot 40.

Figure 15:
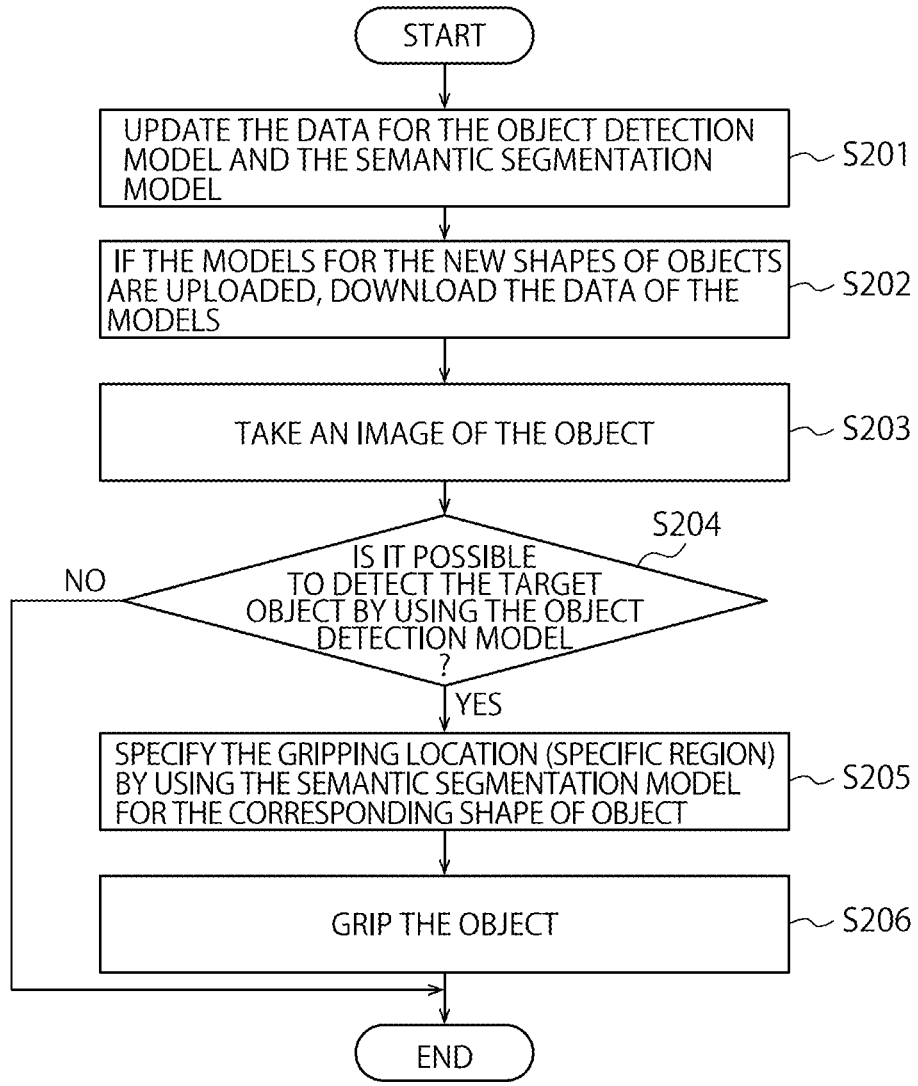
FIG. 15 is a flowchart showing image recognition and gripping of objects by a robot.

FIG. 15 is a flowchart showing image recognition and gripping of objects by the robot 40. Below, the procedures are described in reference to FIG. 15.

First, the robot 40 updates the data for the object detection model and the semantic segmentation model. (Step S201) If the updated models are generated, the robot 40 downloads the data for the models from the characteristics learning device 30 or servers.

If the models (object detection, semantic segmentation) for the new shapes of objects are uploaded to the characteristics learning device 30 or servers, the data of the models are downloaded. (Step S202) Then, the robot 40 can recognize objects with different shapes.

Next, the robot 40 takes an image of the object using the camera 42. (Step S203) The image taken by the camera 42 could be an arbitrary image from an arbitrary angle. When the robot 40 is in operating state, it can take images of the surrounding environment by taking videos. Also, by using timers, it is possible to take images periodically. Also, the images could be taken only when the robot 40 detects than an object is approaching near the robot 40 by a sensor. Thus, the timing for taking images of the objects and the conditions for taking the objects are not limited. The characteristics of the camera used for taking the image have been explained in the description of the camera 42.

When the image is obtained, the robot 40 refers to the distance image to confirm whether it is possible to detect the target object by using the object detection model. If the robot 40 supports multiple object detection models, the robot confirms the object detection model that can be used for detecting the target object. (Step S204) If the target object is detected within the image, the process can proceed to step S205. If the target object cannot be detected, the robot 40 will not execute the gripping operation of the object.

If the target object is detected, the robot 40 specifies the gripping location (specific region) by using the semantic segmentation model for the corresponding shape of object. (Step S205) The robot 40 transforms the information on the location within the distance image to locational information used for controlling the robotic hand 41.

For example, by transformation of coordinates, the three-dimensional locational information of the gripping location relative to the point of reference within the coordinate system of the distance image could be transformed to coordinates used in the coordinate system of the robotic hand 41. The transformed locational information could be transmitted by using control signals. The control signals are sent from the image recognition unit 44 to the robotic hand 41. Thus, the robot 40 moves the robotic hand 41 to the specified gripping location.

Thus, the robot 40 moves the robotic hand 41 to the specified gripping position. The semantic segmentation does not have to be executed for the whole image. The semantic segmentation could be executed only for the regions where the object is detected within the image.

Finally, the robot 40 grips the object with the robotic hand 41. (Step S206) The robotic hand 41 is manipulated based on the locational information for the gripping location, obtained in step S205. The detailed instructions of the robotic hand 41 are sent by the image recognition unit 44. Examples of the tasks executed by the robot 40 include cargo handling and assortment of packages. However, the robot 40 could execute other tasks.

(First Variation)

The three-dimensional imaging device according to the first embodiment took multi-view distance images by placing the object on a platform that can rotate and using an imaging unit which can move in an arc trajectory. The three-dimensional imaging device can have a different structure as long as it is possible to take multi-view images. In the three-dimensional imaging device according to the first variation, the target object is placed on a rotating platform which is mounted on a gimbal mechanism to take multi-view images.

Besides the three-dimensional imaging device, the configuration of the system according to the first variation is similar to the system according to the first embodiment. Below, the differences between the first embodiment and the first variation are mainly described.

Figure 16:
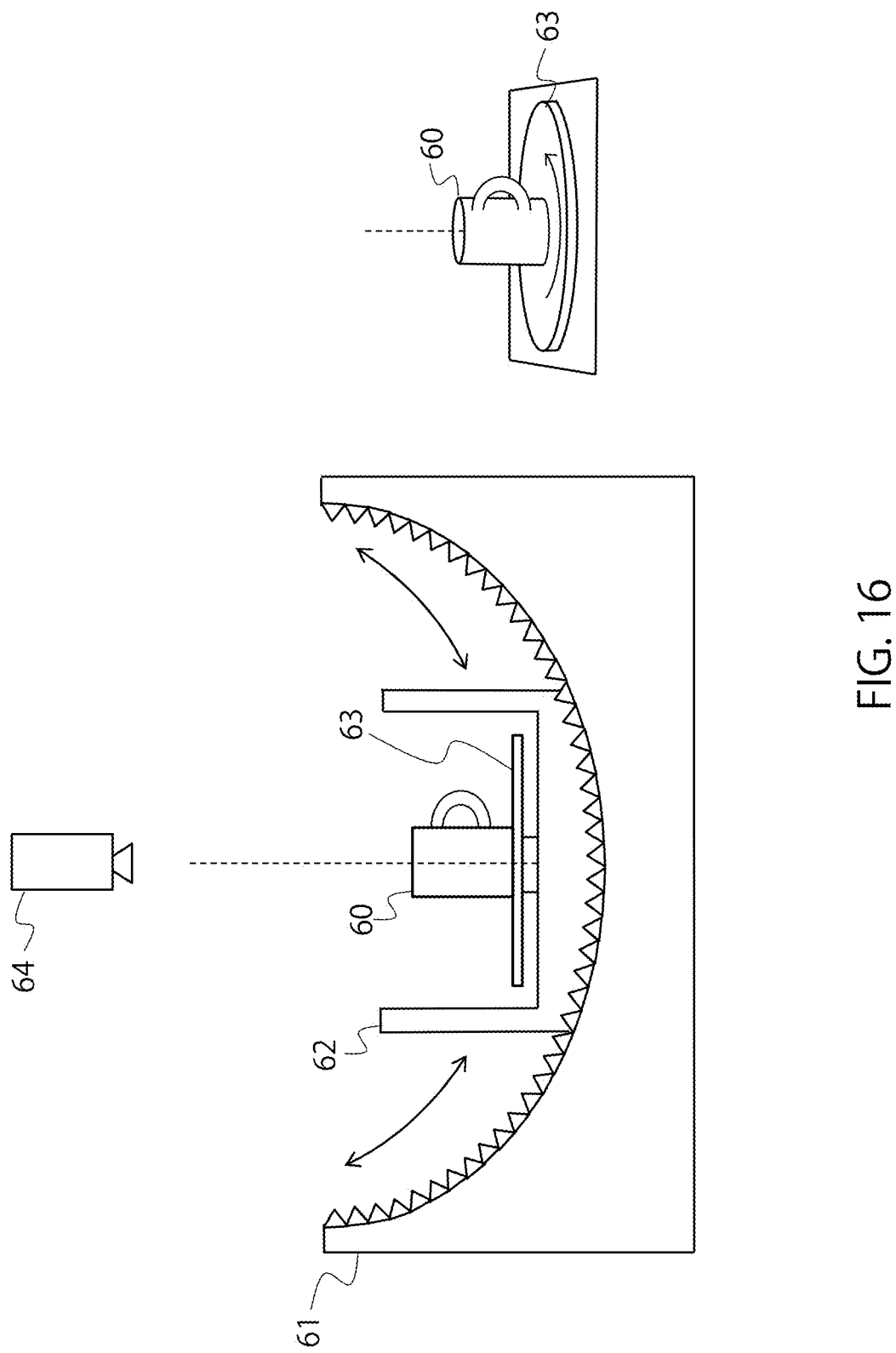
FIG. 16 is a diagram showing an example of a three-dimensional imaging device according to the first variation.

FIG. 16 is a diagram showing an example of the three-dimensional imaging device according to the first variation. The left side of FIG. 16 shows the cross sectional diagram of the three-dimensional imaging device with gimbal mechanism. The right side of FIG. 16 shows the platform viewed from the diagonal direction.

In the example of FIG. 16, a coffee cup 60 is the target object. The three-dimensional imaging device according to the first variation includes a gimbal structure 61, a basket 62, a platform 63 and an imaging unit 64. Below, each component of the components are described.

The gimbal mechanism 61 has a hemispherical convexity in the top side. The gimbal mechanism 61 has mechanism to adjust the location of the basket 62, within the hemispherical convexity. Regardless of the adjusted location of the basket 62, the top side of the basket 62 always faces the center of the hemisphere formed by the gimbal mechanism 61.

The adjustment of the location of the basket 62 by the gimbal structure could be done by combining suspended frames which rotate in a certain axis. Also, it is possible to implement rotation mechanisms using bearings. Thus, the adjustment of basket 62 could be done by using different methods.

The basket 62 is a container with an opened top. Within the basket 62, the platform 63 is mounted. As mentioned above, the location of the basket 62 is adjusted by using the gimbal mechanism 61.

The platform 63 is a disk-shaped platform. The platform 63 can rotate. The axis of rotation is in the center of the disk. In FIG. 16, the axis of rotation for the platform 63 is shown in a broken line. The rotational movement of the platform 63 could be achieved by placing motors or rotary actuators below the platform 63. In the drawings of the left side and the right side of FIG. 16, the coffee cup 60 is placed on the platform 63. To prevent the target object from slipping when the platform 63 is rotating, it is possible to make the surface of the platform 63 slip-resistant. Also, mechanisms that fix the location of the object could be implemented.

The imaging unit 64 is located right above the center of the hemisphere formed by the gimbal structure 61. The location of the imaging unit 62 could be fixed. Some mechanism could be implemented to make the location and direction of the imaging unit 62 adjustable.

For example, it is possible to implement three-dimensional rotation mechanism in the base of the imaging unit 64, located in the opposite side of the lens. The imaging unit 64 is a camera which takes distance images, by using a three-dimensional imaging sensor implemented inside the camera. The three-dimensional imaging sensor of the imaging unit could be a ToF sensor, a RGB-D sensor or other types of sensors.

Figure 17:
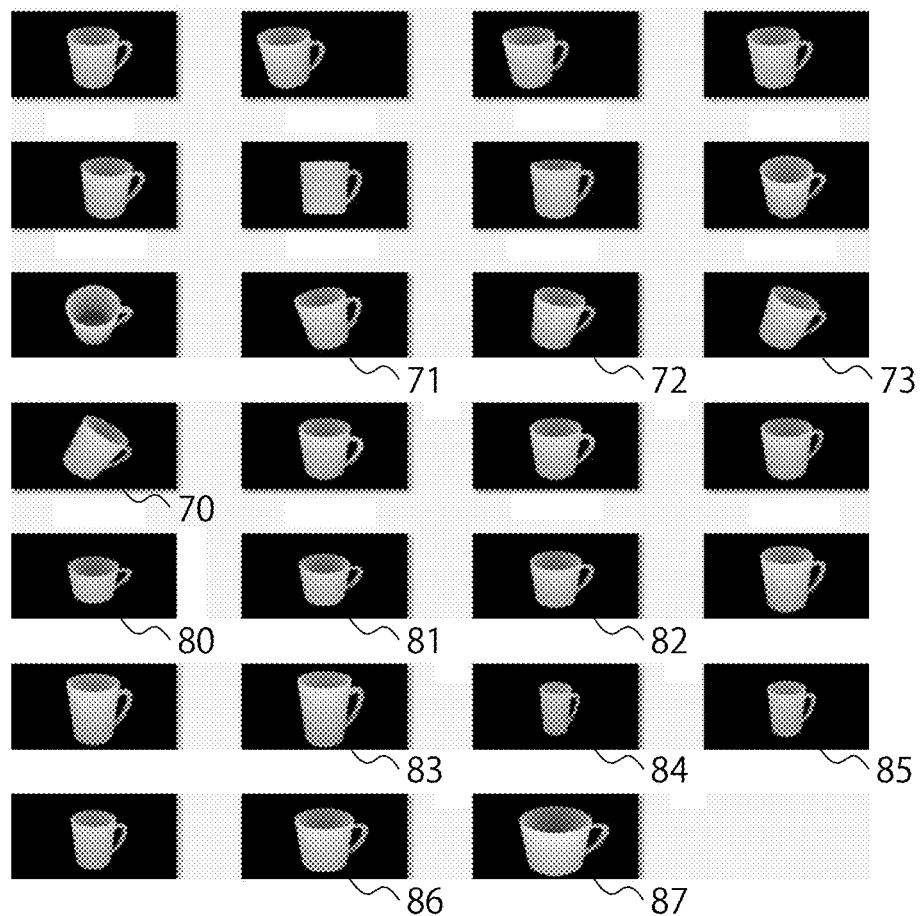
FIG. 17 shows examples of multi-angle distance images of coffee cups.

FIG. 17 shows examples of multi-view distance images of coffee cups. FIG. 17 shows a plurality of images used for learning. FIG. 17 includes images with coffee cups placed in different angles. For example, the angles of the coffee cups are tilted in images 70-73. By using the three-dimensional imaging device according to the first variation, it is possible to take images of tilted objects.

Also, FIG. 17 includes a variation of coffee cups with different height-width ratios. Also, there are coffee cups of different sizes. For example, images 80-82 shows coffee cups with low heights. In images 83-85, there are coffee cups with greater ratios for the height. In images 84 and 85, the sizes of the coffee cups are reduced. Images 86 and 87 show coffee cups with greater ratios for the width.

By using images of coffee cups with different height-width ratios or scales as the teacher data, it is possible to learn a model which can recognize coffee cups with various shapes.

It is possible to prepare multiple coffee cups with different height-width ratios and sizes to take distance images. However, preparing only one coffee cup is sufficient for taking images. For example, by applying expansion operations, contraction operations, magnification operations or shrinking operations to distance images of the actual coffee cup, it is possible to prepare images for a variation of coffee cups.

If the number of the distance images that were actually taken is limited, it is possible to generate new distance images by editing existing distance images. Increasing the number of distance images for the sake of efficient learning is called data augmentation. Examples of data augmentation include the aforementioned operations, parallel shifts, rotations, reversions, modification of darkness, changed colors, additions of random noise, blur corrections or the like.

Figure 18:
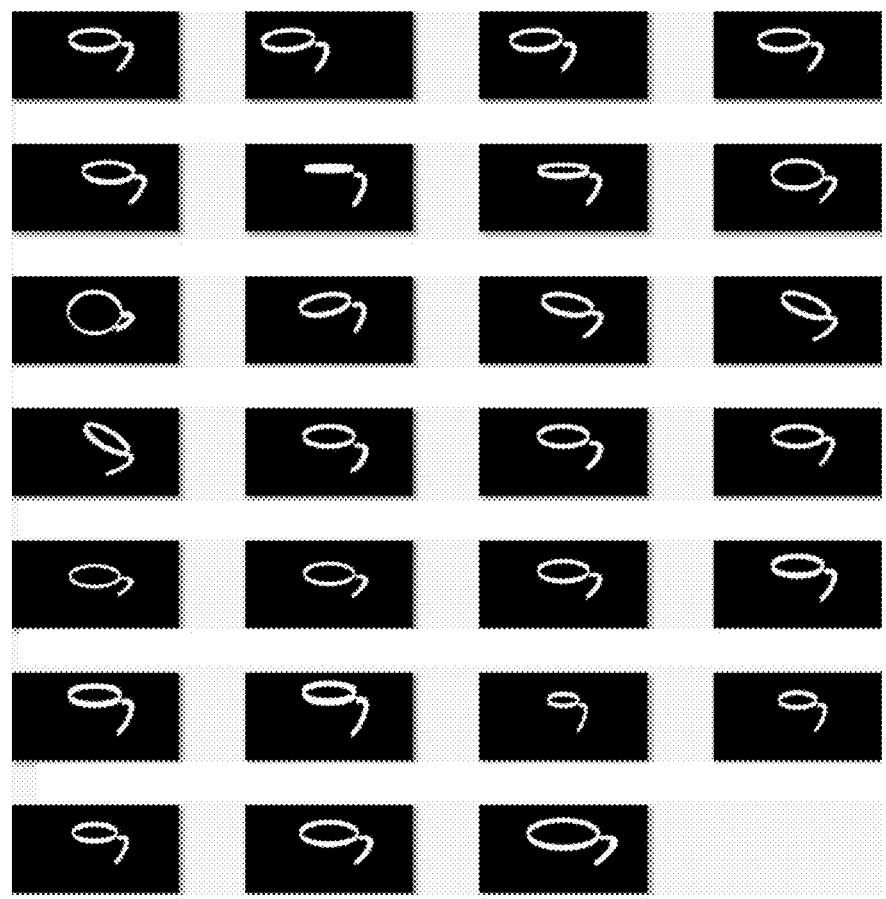
FIG. 18 shows examples of the gripping locations of coffee cups generated by three-dimensional CAD software.

FIG. 18 shows examples of the gripping locations of coffee cups generated by three-dimensional CAD software. Each image in FIG. 18 corresponds to each image in FIG.

17. The three-dimensional models are generated by using the 3D point cloud data in the images of FIG. 17. Since only the coordinates corresponding to the gripping locations are labeled in the images for the three-dimensional models, FIG. 18 has only black-and-white images.

Figure 19:
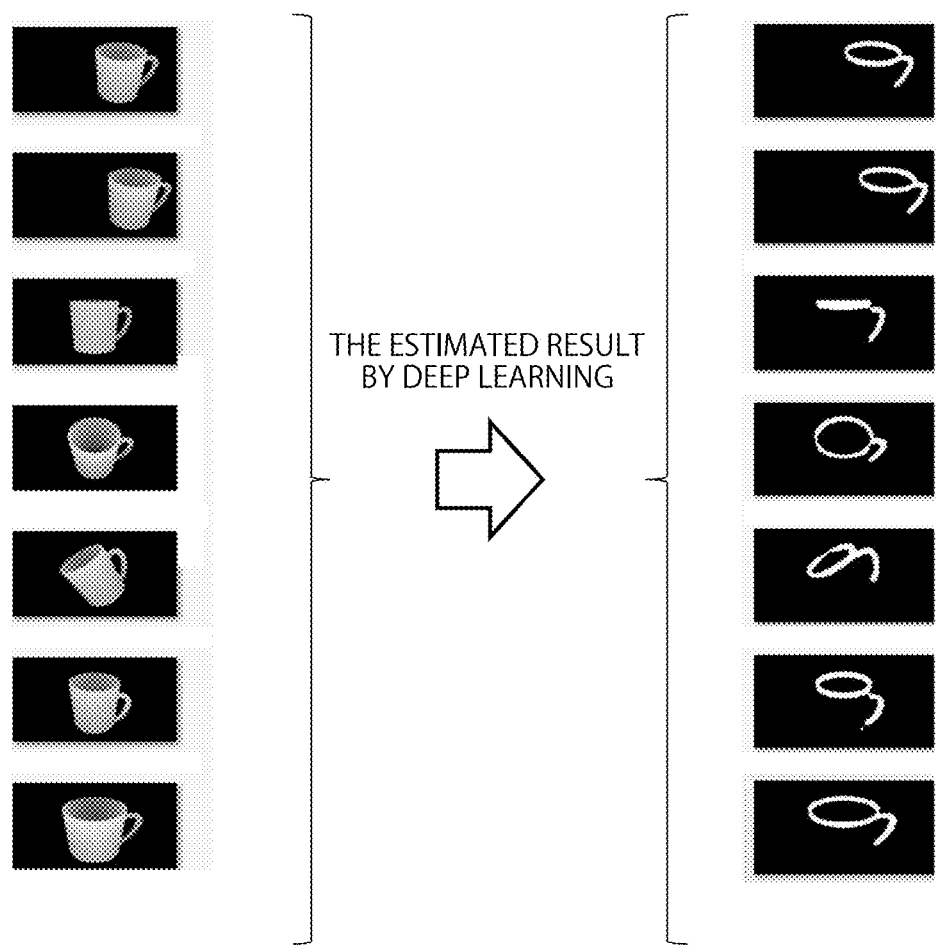
FIG. 19 shows examples of estimated gripping locations of a coffee cup.

FIG. 19 shows examples of estimated gripping locations of a coffee cup. The left side of FIG. 19 shows the input images generated by three-dimensional CAD software. The right side of FIG. 19 shows the gripping locations estimated by deep learning. From the results it can be inferred that by using input images generated by the three-dimensional CAD software, it is possible to estimate the gripping locations.

(Second Variation)

The number of imaging units (cameras) was one for each of the aforementioned three-dimensional imaging devices. However, there could be multiple imaging units (cameras). The three-dimensional imaging device according to the second variation has multiple imaging units (cameras). Besides the three-dimensional imaging device, the other configurations of the system according to the second variation is similar to the system according to the first embodiment. Below, the difference between the system according to the first embodiment and the system according to the second variation is explained.

Figure 20:
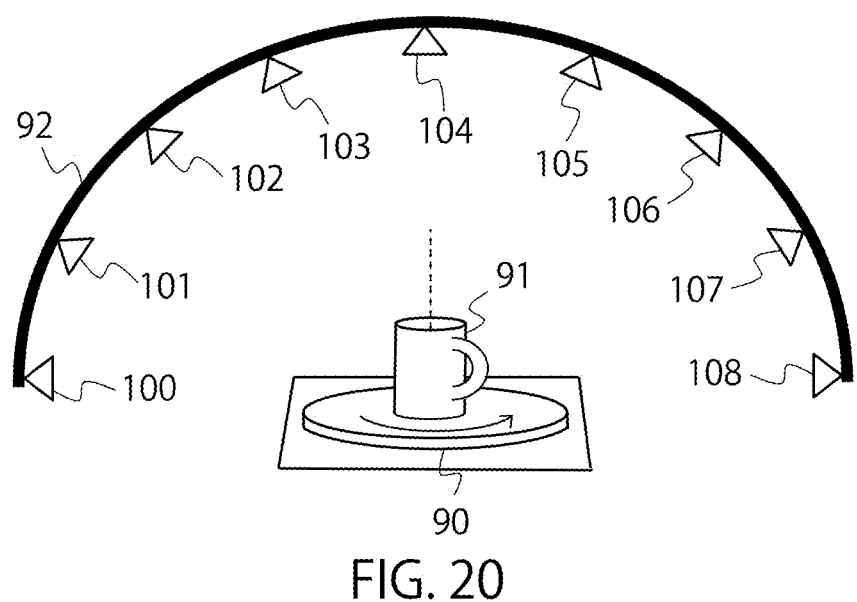
FIG. 20 is a diagram showing an example of a three-dimensional imaging device according to the second variation.

FIG. 20 shows an example of the three-dimensional imaging device according to the second variation. In FIG. 20, a coffee cup 91 is the target object. The three-dimensional imaging device according to the second variation includes a platform 90, a camera supporting component 92, imaging units 100-108.

The platform 90 is a disk-shaped platform which can rotate. The rotational axis of the platform 90 is located in the center of the disk. In FIG. 20, the rotational axis of the platform 90 is shown in a broken line. The rotational movement of the platform 90 is enabled by motors or rotary actuators located below the platform 90. In FIG. 20, the coffee cup 91 is placed above the platform 90.

The camera supporting component 92 is an arc-shaped structure that can support a plurality of three-dimensional image sensors (cameras). In the example of FIG. 20, the camera supporting component 92 is half-circle shaped. In the center of the half-circle formed by the camera supporting component 92, the platform 90 is located. On the platform 90, the target object is placed. In the example of FIG. 20, a plurality of imaging units are located in the angle of approximately 22.5 degrees, observed from the center of the half-circle formed by the camera supporting component 92. However, the space between the imaging units and the number of imaging units could be different.

The imaging units 100-108 are cameras with three-dimensional image sensors. Since the angles of each camera relative to the target object are shifted, it is possible to take distance images from different angles. The three-dimensional image sensors in the imaging units 100-108 could be ToF sensors, RGB-D sensors or some other type of sensor.

In the three-dimensional imaging device according to the second variation, an actuator is only located below the platform 90. Therefore, the mechanical structure is simplified, reducing the maintenance cost. Also, since the plurality if imaging units 100-108 can take images simultaneously, it is possible to reduce the time required to take multi-view distance images.

Second Embodiment

In the first embodiment, a system applied to cargo handling was described as an example. The aforementioned image recognition technology could be applied to fields other than cargo handling. The target of image recognition could be creatures that could take different postures such as animals or human-beings.

The configuration of the three-dimensional imaging device, the image processing device and the characteristics learning device are similar to the first embodiment. The system according to the second embodiment has an image recognition unit instead of the robot. The image recognition unit according to the second embodiment detects objects and executes semantic segmentation by using distance images taken by the cameras with three-dimensional image sensors. In the first embodiment, the specific region of the object which was the subject of semantic segmentation and image recognition was the gripping location (region). However, in the second embodiment, a part of the bodies of human-beings or animals are treated as the specific regions for semantic segmentation and image recognition.

The process of generating the object detection model and the semantic segmentation model is similar to that of the first embodiment. The image recognition unit according to the second embodiment uses the learned model to recognize images. Monitoring equipment which has a camera could include the image recognition unit. Information processing devices such as computers could include an image recognition unit. Thus, the location of the image recognition unit is not limited. Also, there could be multiple cameras that have three-dimensional image sensors.

Figure 21:
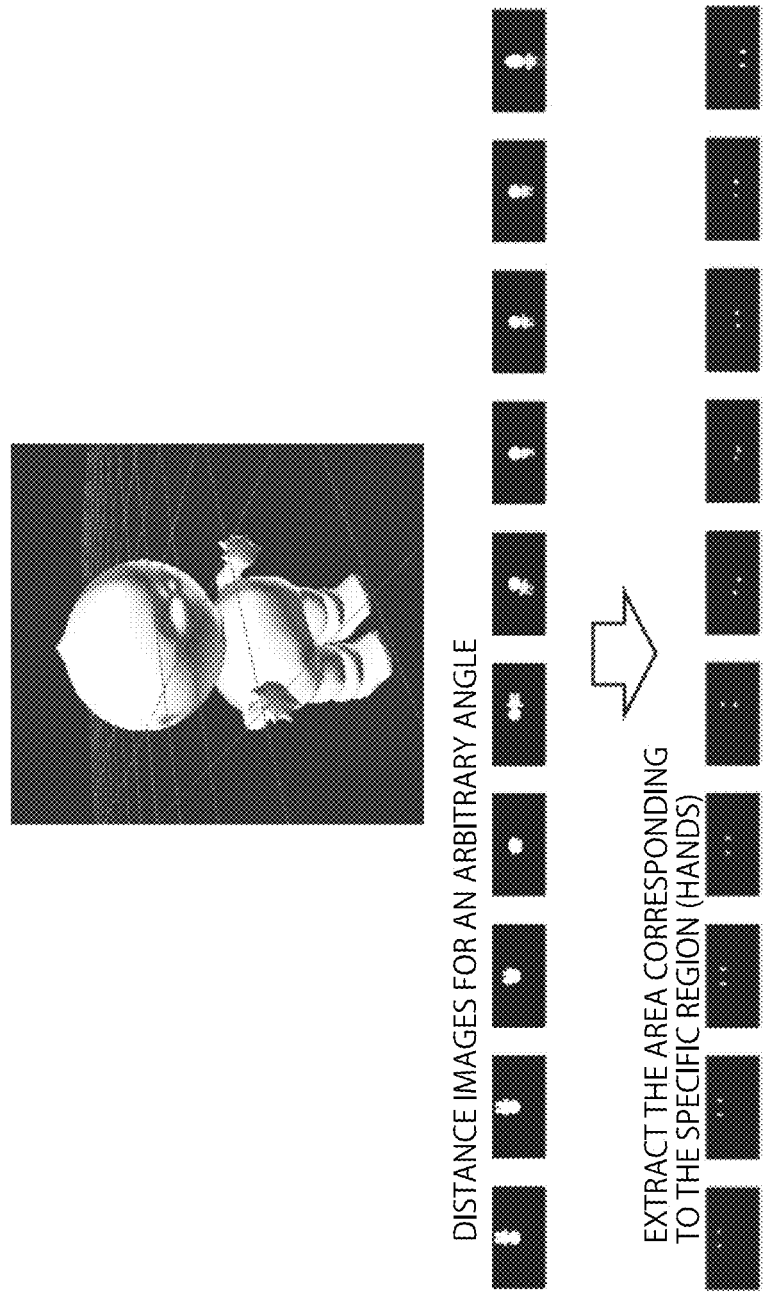
FIG. 21 is a diagram showing an example of semantic segmentation for a doll.

FIG. 21 is a diagram showing an example of semantic segmentation for a doll. The semantic segmentation for hands is only an example. Other regions such as faces or feet could be the subject of semantic segmentation. Also, the doll in FIG. 21 is taking a standing posture. However, dolls that are in sitting posture, lying posture or playing posture can be used for learning. By using dolls in different postures to learn models, it is possible do execute the image recognition of human-beings that are not in standing posture.

It is possible to use a large three-dimensional imaging device to obtain multi-view distance images for actual human-beings. However, since the size of the target of image recognition and the objects used for taking learning images could be different, it is possible to use miniaturized models for taking images. If a three-dimensional imaging device of a large size is not available, it is possible to use a three-dimensional modeling device (a 3D printer) to generate a miniaturized model of a human being. Then, the images of the miniaturized model can be taken.

The images of the human-beings could be taken from surveillance cameras monitoring public locations. It is possible to use analytical cameras placed in stadiums. First, by using the object detection model, the posture of the human-being is estimated. Then, by using the semantic segmentation model, the location of a specific location of the human body is estimated. By executing this process periodically, it is possible to obtain information on the movements of the body. Thus, it is possible to detect personnel who are involved in suspicious activities. It is also possible to analyze the movement of sport players.

Third Embodiment

In the third embodiment, the aforementioned system which recognizes images is applied to the monitoring of automobiles. The configuration of the three-dimensional imaging device, the image processing device and the characteristics learning device are similar to that of the first embodiment. The system according to the third embodiment has an image recognition unit instead of the robot. The image recognition unit according to the third embodiment detects objects and executes semantic segmentation by using distance images taken by the cameras with three-dimensional image sensors. In the first embodiment, the specific region of the object which was the subject of semantic segmentation and image recognition was the gripping location (region). However, in the third embodiment, a part of the moving bodies such as automobiles are treated as the specific regions for semantic segmentation and image recognition.

The process of generating the object detection model and the semantic segmentation model is similar to that of the first embodiment. The image recognition unit according to the third embodiment uses the learned model to recognize images. The image recognition unit could be included in monitoring equipment with cameras. The image recognition unit could be included in information processing devices such as computers. Thus, the location of the image recognition unit is not limited. Also, there could be multiple cameras that have three-dimensional image sensors.

Figure 22:
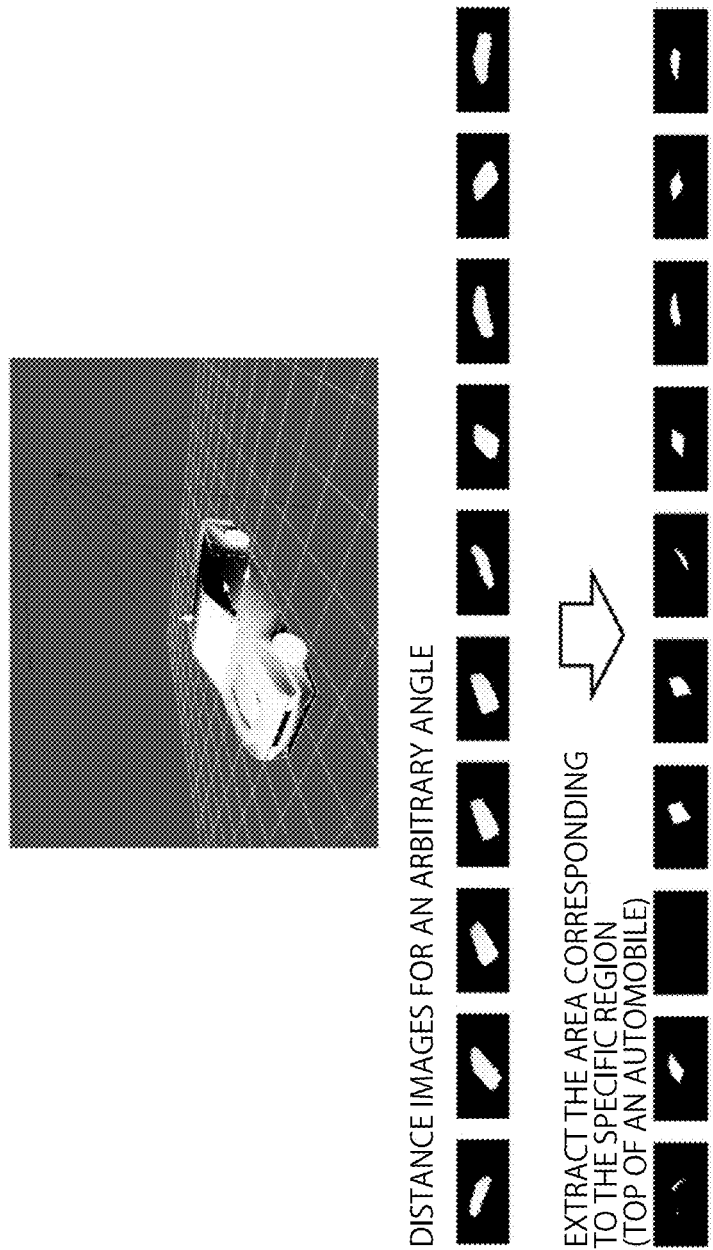
FIG. 22 is a diagram showing an example of semantic segmentation for an automobile.

FIG. 22 shows an example of semantic segmentation for an automobile. In the example of FIG. 22, the region corresponding to the top of the automobile including the roof, the front glass, the side glass and the rear glass are being detected. The top of the automobile is only an example of the subject for semantic segmentation. It is possible to configure the number plates, the drivers as the subjects for semantic segmentation.

For automobiles, it is possible to generate a miniaturized model by using the design data. By using the miniaturized data, it is possible to generate the multi-view distance images. Based on the multi-view distance images and the extracted images corresponding to each distance image, the teacher data is generated.

It is possible to prepare the teacher data for each specific model. However, it is possible to create the teacher data based on general categories. For example, it is possible to generate the teacher data for sedans, Japanese Kei cars, wagons, coupes, one-box-cars, trucks and buses, respectively.

The image recognition system according to the third embodiment can be applied to images taken by road monitoring cameras, for example. The purpose of semantic segmentation could be reading the number plate of automobiles which violated the traffic regulations or detecting characteristics of the drivers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing device comprising:
a camera configured to generate first distance images of an object for a plurality of angles; and
a processing circuit configured to:
generate three-dimensional models of the object based on each of the first distance images;
generate extracted images indicating a specific region in the object from the three-dimensional models;
generate a first model which detects the object within an arbitrary second distance image, based on the first distance images; and
generate a second model which estimates the location of the specific region in the second distance image, based on the extracted images and the first distance images.

2. The information processing device according to claim 1, wherein
the processing circuit determines the specific region of the object by searching the region of the object which satisfies a condition that includes at least either a relative location in the object, a flat area on the object or a width of an edge of the object, in the three-dimensional model.

3. The information processing device according to claim 1, wherein
the processing circuit determines the specific region of the object, based on color information of the object.

4. The information processing device according to claim 1, wherein
the processing circuit generates a new first distance image by performing at least either expansion operations, contraction operations or rotation operations to the plurality of first distance images, and generates a three-dimensional model of the object based on the new first distance image.

5. The information processing device according to claim 1, wherein
the processing circuit generates a combination of the first model and the second model for a plurality of the objects.

6. The information processing device according to claim 5, wherein
the processing circuit uses back propagation method in a neural network for at least either generation of the first model or generation of the second model.

7. The information processing device according to claim 1, wherein
the processing circuit estimates the location of the specific region by applying the second model to the second distance image taken from an arbitrary angle.

8. The information processing device according to claim 1, wherein
the processing circuit estimates the location of the specific region by applying the second model, when the object is detected by applying the first model to the second distance image taken from an arbitrary angle.

9. The information processing device according to claim 5, wherein
the processing circuit estimates the location of the specific region by applying the second model, when the object is detected by applying either of the first models to the second distance image taken from an arbitrary angle, and
the second model which is applied by the processing circuit is the second model for estimating the location of the specific region in the object detected by the first model.

10. The information processing device according to claim 8, wherein
the processing circuit determines the location a robotic hand grips as the specific region of the object, and provides locational information including the estimated location of the specific region in the object as control signals of the robotic hand.

11. An information processing device according to claim 8, further comprising:

a display displaying at least either the first distance image, the three-dimensional model, the extracted image, the first model or the second model.

12. An image recognition method comprising:

generating first distance images of an object from a plurality of angles;

generating three-dimensional models of the object based on each of the first distance images;

generating extracted images indicating a specific region in the object from the three-dimensional models;

generating a first model which detects the object within an arbitrary second distance image based on the first distance images; and generating a second model which estimates the location of the specific region in the second distance image, based on the extracted images and the first distance images.

13. A non-transitory computer readable medium having a computer program stored therein which causes a computer to execute processes comprising:

generating first distance images of an object from a plurality of angles;

generating three-dimensional models of the object based on each of the first distance images;

generating extracted images indicating a specific region in the object from the three-dimensional models;

generating a first model which detects the object within an arbitrary second distance image, based on the first distance images; and generating a second model which estimates the location of the specific region in the second distance image, based on the extracted images and the first distance images.

* * * * *